United States Patent
Eisen

(10) Patent No.: US 11,727,471 B2
(45) Date of Patent: *Aug. 15, 2023

(54) SYSTEMS AND METHODS FOR DETECTION OF SESSION TAMPERING AND FRAUD PREVENTION

(71) Applicant: The 41st Parameter, Inc., Scottsdale, AZ (US)

(72) Inventor: Ori Eisen, Scottsdale, AZ (US)

(73) Assignee: The 41st Parameter, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/518,416

(22) Filed: Nov. 3, 2021

(65) Prior Publication Data
US 2022/0129969 A1 Apr. 28, 2022

Related U.S. Application Data

(63) Continuation of application No. 16/737,256, filed on Jan. 8, 2020, now Pat. No. 11,195,225, which is a (Continued)

(51) Int. Cl.
*H04L 29/06* (2006.01)
*G06F 21/00* (2013.01)
(Continued)

(52) U.S. Cl.
CPC ..... *G06Q 30/0635* (2013.01); *G06Q 20/3825* (2013.01); *G06Q 20/4016* (2013.01);
(Continued)

(58) Field of Classification Search
CPC .......... G06Q 30/0635; G06Q 20/3825; G06Q 20/4016; H04L 63/08; H04L 63/0876; H04L 63/1466; H04L 67/02
See application file for complete search history.

(56) References Cited

U.S. PATENT DOCUMENTS

| | | | | |
|---|---|---|---|---|
| 4,801,924 A | * | 1/1989 | Burgmann | G08B 19/00 340/539.22 |
| 4,805,222 A | | 2/1989 | Young et al. | |

(Continued)

FOREIGN PATENT DOCUMENTS

| | | |
|---|---|---|
| AU | 2022206815 | 8/2022 |
| EP | 0 418 144 | 3/1991 |

(Continued)

OTHER PUBLICATIONS

Official Communication in European Patent Application No. 19181057.1, dated Oct. 25, 2021.

(Continued)

*Primary Examiner* — Lisa C Lewis
(74) *Attorney, Agent, or Firm* — Knobbe Martens Olson & Bear LLP

(57) ABSTRACT

The invention provides methods and apparatus for detecting when an online session is compromised. A plurality of device fingerprints may be collected from a user computer that is associated with a designated Session ID. A server may include pages that are delivered to a user for viewing in a browser at which time device fingerprints and Session ID information are collected. By collecting device fingerprints and session information at several locations among the pages delivered by the server throughout an online session, and not only one time or at log-in, a comparison between the fingerprints in association with a Session ID can identify the likelihood of session tampering and man-in-the middle attacks.

20 Claims, 3 Drawing Sheets

| SESSION ID | FINGERPRINT | TIME | PAGE |
|---|---|---|---|
| SID$_1$ | FP$_1$ | t$_1$ | P$_1$ |
| | FP$_2$ | t$_2$ | P$_2$ |
| | FP$_3$ | t$_3$ | P$_3$ |
| | ... | ... | ... |
| SID$_2$ | FP$_1$ | t$_1$ | P$_1$ |
| | FP$_2$ | t$_2$ | P$_2$ |
| ... | ... | ... | ... |

Related U.S. Application Data continuation of application No. 16/115,411, filed on Aug. 28, 2018, now Pat. No. 10,535,093, which is a continuation of application No. 15/655,045, filed on Jul. 20, 2017, now Pat. No. 10,089,679, which is a continuation of application No. 14/931,799, filed on Nov. 3, 2015, now Pat. No. 9,754,311, which is a continuation of application No. 14/473,818, filed on Aug. 29, 2014, now Pat. No. 9,196,004, which is a continuation of application No. 13/414,678, filed on Mar. 7, 2012, now Pat. No. 8,826,393, which is a continuation of application No. 11/694,882, filed on Mar. 30, 2007, now Pat. No. 8,151,327.

(60) Provisional application No. 60/744,107, filed on Mar. 31, 2006.

(51) Int. Cl.
  *G06Q 30/0601* (2023.01)
  *G06Q 20/38* (2012.01)
  *H04L 9/40* (2022.01)
  *G06Q 20/40* (2012.01)
  *H04L 67/02* (2022.01)

(52) U.S. Cl.
  CPC .......... *H04L 63/08* (2013.01); *H04L 63/0876* (2013.01); *H04L 63/1466* (2013.01); *H04L 67/02* (2013.01)

(56) References Cited

U.S. PATENT DOCUMENTS

| | | |
|---|---|---|
| 4,912,761 A | 3/1990 | Tan et al. |
| 4,924,387 A | 5/1990 | Jeppesen |
| 5,184,849 A | 2/1993 | Taylor |
| 5,491,735 A | 2/1996 | Hsieh |
| 5,519,827 A | 5/1996 | Mizushima |
| 5,521,907 A | 5/1996 | Ennis, Jr. |
| 5,557,686 A | 9/1996 | Brown et al. |
| 5,583,380 A | 12/1996 | Larsen et al. |
| 5,627,886 A | 5/1997 | Bowman |
| 5,679,940 A | 10/1997 | Templeton et al. |
| 5,721,765 A | 2/1998 | Smith |
| 5,724,424 A | 3/1998 | Gifford |
| 5,748,740 A | 5/1998 | Curry et al. |
| 5,748,780 A | 5/1998 | Stolfo et al. |
| 5,764,275 A | 6/1998 | Lappington et al. |
| 5,802,156 A | 9/1998 | Felger |
| 5,819,226 A | 10/1998 | Gopinathan et al. |
| 5,864,620 A | 1/1999 | Pettitt |
| 5,884,289 A | 3/1999 | Anderson et al. |
| 5,886,334 A | 3/1999 | D'Entremont |
| 5,892,900 A | 4/1999 | Ginter et al. |
| 5,894,510 A | 4/1999 | Felger |
| 5,899,980 A | 5/1999 | Wilf et al. |
| 5,903,646 A | 5/1999 | Rackman |
| 5,903,721 A | 5/1999 | Sixtus |
| 5,933,480 A | 8/1999 | Felger |
| 5,960,069 A | 9/1999 | Felger |
| 6,009,523 A | 12/1999 | Owaki et al. |
| 6,029,154 A | 2/2000 | Pettitt |
| 6,029,159 A | 2/2000 | Zorba et al. |
| 6,062,474 A | 5/2000 | Kroll |
| 6,078,907 A | 6/2000 | Lamm |
| 6,092,053 A | 7/2000 | Boesch et al. |
| 6,094,643 A | 7/2000 | Anderson et al. |
| 6,105,012 A | 8/2000 | Chang et al. |
| 6,112,240 A | 8/2000 | Pogue et al. |
| 6,148,407 A | 11/2000 | Aucsmith |
| 6,151,593 A | 11/2000 | Cho et al. |
| 6,163,604 A | 12/2000 | Baulier et al. |
| 6,163,771 A | 12/2000 | Walker et al. |
| 6,164,528 A | 12/2000 | Hills et al. |
| 6,205,436 B1 | 3/2001 | Rosenberg et al. |
| 6,209,104 B1 | 3/2001 | Jalili |
| 6,216,153 B1 | 4/2001 | Vortriede |
| 6,223,289 B1 | 4/2001 | Wall et al. |
| 6,282,276 B1 | 8/2001 | Felger |
| 6,295,605 B1 | 9/2001 | Dockter et al. |
| 6,327,384 B1 | 12/2001 | Hirao et al. |
| 6,330,546 B1 | 12/2001 | Gopinathan et al. |
| 6,370,648 B1 | 4/2002 | Diep |
| 6,405,922 B1 | 6/2002 | Kroll |
| 6,442,529 B1 | 8/2002 | Krishan et al. |
| 6,442,692 B1 | 8/2002 | Zilberman |
| 6,457,021 B1 | 9/2002 | Berkowitz et al. |
| 6,480,710 B1 | 11/2002 | Laybourn et al. |
| 6,509,847 B1 | 1/2003 | Anderson |
| 6,523,019 B1 | 2/2003 | Borthwick |
| 6,546,493 B1 | 4/2003 | Magdych et al. |
| 6,553,108 B1 | 4/2003 | Felger |
| 6,560,455 B2 | 5/2003 | Amin et al. |
| 6,567,099 B1 | 5/2003 | Dawson |
| 6,597,775 B2 | 7/2003 | Lawyer et al. |
| 6,646,765 B1 | 11/2003 | Barker et al. |
| 6,678,666 B1 | 1/2004 | Boulware |
| 6,687,390 B2 | 2/2004 | Avni et al. |
| 6,687,696 B2 | 2/2004 | Hofmann et al. |
| 6,689,055 B1 | 2/2004 | Mullen et al. |
| 6,718,363 B1 | 4/2004 | Ponte |
| 6,745,333 B1 | 6/2004 | Thomsen |
| 6,803,920 B2 | 10/2004 | Gossett et al. |
| 6,804,624 B2 | 10/2004 | Silverman |
| 6,850,606 B2 | 2/2005 | Lawyer et al. |
| 6,892,307 B1 | 5/2005 | Wood et al. |
| 6,895,507 B1 | 5/2005 | Tepler |
| 6,895,514 B1 | 5/2005 | Kermani |
| 6,898,709 B1 | 5/2005 | Teppler |
| 6,908,030 B2 | 6/2005 | Rajasekaran et al. |
| 6,937,569 B1 | 8/2005 | Sarkar et al. |
| 6,947,978 B2 | 9/2005 | Huffman |
| 6,954,532 B1 | 10/2005 | Handley et al. |
| 6,957,185 B1 | 10/2005 | Labaton |
| 6,957,339 B2 | 10/2005 | Shinzaki |
| 7,002,712 B2 | 2/2006 | Barker et al. |
| 7,003,670 B2 | 2/2006 | Heaven et al. |
| 7,007,174 B2 | 2/2006 | Wheeler et al. |
| 7,013,001 B1 | 3/2006 | Felger |
| 7,027,800 B2 | 4/2006 | Haumont et al. |
| 7,039,505 B1 | 5/2006 | Southard et al. |
| 7,039,699 B1 | 5/2006 | Narin et al. |
| 7,043,640 B2 | 5/2006 | Pritchard et al. |
| 7,089,310 B1 | 8/2006 | Ellerman et al. |
| 7,089,585 B1 | 8/2006 | Dharmarajan |
| 7,096,192 B1 | 8/2006 | Pettitt |
| 7,100,049 B2 | 8/2006 | Gasparini et al. |
| 7,103,570 B1 | 9/2006 | Morea et al. |
| 7,103,668 B1* | 9/2006 | Corley ............... H04L 65/80 725/105 |
| 7,120,590 B1 | 10/2006 | Eisen et al. |
| 7,130,858 B2 | 10/2006 | Ciaramitaro et al. |
| 7,143,095 B2* | 11/2006 | Barrett ............... G06F 21/34 |
| 7,158,622 B2 | 1/2007 | Lawyer et al. |
| 7,165,051 B2* | 1/2007 | Ronning ............ G06Q 30/0609 705/64 |
| 7,174,454 B2 | 2/2007 | Roskind |
| 7,191,467 B1 | 3/2007 | Dujari et al. |
| 7,197,646 B2 | 3/2007 | Fritz et al. |
| 7,206,938 B2 | 4/2007 | Bender et al. |
| 7,221,949 B2 | 5/2007 | Clough |
| 7,225,974 B2 | 6/2007 | Yamauchi |
| 7,237,717 B1 | 7/2007 | Rao et al. |
| 7,249,093 B1* | 7/2007 | King ............... G06Q 30/06 705/40 |
| 7,251,624 B1 | 7/2007 | Lee et al. |
| 7,260,837 B2 | 8/2007 | Abraham et al. |
| 7,263,492 B1 | 8/2007 | Suresh et al. |
| 7,263,506 B2 | 8/2007 | Lee et al. |
| 7,272,610 B2 | 9/2007 | Torres |
| 7,272,728 B2 | 9/2007 | Pierson et al. |
| 7,292,723 B2 | 11/2007 | Tedesco et al. |

(56) References Cited

U.S. PATENT DOCUMENTS

| | | | |
|---|---|---|---|
| 7,293,096 B1 * | 11/2007 | Foltak | H04L 63/0892 |
| | | | 709/227 |
| 7,296,088 B1 | 11/2007 | Padmanabhan et al. | |
| 7,328,216 B2 | 2/2008 | Hofmann et al. | |
| 7,330,824 B1 | 2/2008 | Kanojia et al. | |
| 7,330,871 B2 | 2/2008 | Barber | |
| 7,340,045 B2 | 3/2008 | Felger | |
| 7,346,551 B2 | 3/2008 | Pe Jimenez et al. | |
| 7,346,775 B2 | 3/2008 | Gasparinl et al. | |
| 7,349,955 B1 | 3/2008 | Korb et al. | |
| 7,359,962 B2 | 4/2008 | Willebeek-LeMair et al. | |
| 7,363,170 B2 | 4/2008 | Seul et al. | |
| 7,373,669 B2 | 5/2008 | Eisen | |
| 7,376,618 B1 | 5/2008 | Anderson et al. | |
| 7,379,891 B1 | 5/2008 | Donner et al. | |
| 7,386,892 B2 | 6/2008 | Gilfix et al. | |
| 7,404,087 B2 | 6/2008 | Teunen | |
| 7,401,082 B2 | 7/2008 | Keene et al. | |
| 7,403,922 B1 | 7/2008 | Lewis et al. | |
| 7,406,441 B2 | 7/2008 | Kimura et al. | |
| 7,428,587 B2 | 9/2008 | Rowland et al. | |
| 7,436,780 B2 | 10/2008 | Stephens | |
| 7,438,226 B2 | 10/2008 | Helsper et al. | |
| 7,447,494 B2 | 11/2008 | Law et al. | |
| 7,451,487 B2 | 11/2008 | Oliver et al. | |
| 7,457,401 B2 | 11/2008 | Lawyer et al. | |
| 7,457,823 B2 | 11/2008 | Shraim et al. | |
| 7,475,242 B2 | 1/2009 | Baird et al. | |
| 7,478,182 B2 | 1/2009 | Schweig | |
| 7,487,350 B2 | 2/2009 | Utin | |
| 7,496,752 B2 | 2/2009 | Yamaguchi et al. | |
| 7,497,374 B2 | 3/2009 | Helsper et al. | |
| 7,502,610 B2 | 3/2009 | Maher | |
| 7,502,933 B2 | 3/2009 | Jakobsson et al. | |
| 7,526,796 B2 | 4/2009 | Lulich et al. | |
| 7,543,740 B2 | 6/2009 | Greene et al. | |
| 7,552,090 B1 | 6/2009 | Barber | |
| 7,555,458 B1 | 6/2009 | Felger | |
| 7,562,221 B2 | 7/2009 | Nyström et al. | |
| 7,577,620 B1 | 8/2009 | Donner | |
| 7,581,112 B2 | 8/2009 | Brown et al. | |
| 7,606,560 B2 | 10/2009 | Labrou et al. | |
| 7,630,924 B1 | 12/2009 | Collins et al. | |
| 7,631,808 B2 | 12/2009 | Kundu et al. | |
| 7,657,626 B1 | 2/2010 | Zwicky | |
| 7,660,902 B2 | 2/2010 | Graham et al. | |
| 7,665,140 B2 | 2/2010 | Oliver et al. | |
| 7,665,658 B2 | 2/2010 | Fields | |
| 7,673,793 B2 | 3/2010 | Greene et al. | |
| 7,685,629 B1 | 3/2010 | White et al. | |
| 7,698,743 B2 | 4/2010 | Ohmori et al. | |
| 7,708,200 B2 | 5/2010 | Helsper et al. | |
| 7,711,846 B2 | 5/2010 | Padmanabhan et al. | |
| 7,735,141 B1 | 6/2010 | Noel et al. | |
| 7,739,402 B2 | 6/2010 | Roese et al. | |
| 7,739,512 B2 | 6/2010 | Hawkes | |
| 7,743,409 B2 | 6/2010 | Gonzalez et al. | |
| 7,752,084 B2 | 7/2010 | Pettitt | |
| 7,756,783 B2 | 7/2010 | Crooks | |
| 7,761,379 B2 | 7/2010 | Zoldi et al. | |
| 7,769,032 B1 | 8/2010 | Ou | |
| 7,778,846 B2 | 8/2010 | Suresh et al. | |
| 7,788,195 B1 | 8/2010 | Subramanian et al. | |
| 7,813,937 B1 | 10/2010 | Pathria et al. | |
| 7,813,944 B1 | 10/2010 | Luk et al. | |
| 7,814,029 B1 | 10/2010 | Siegel | |
| 7,849,029 B2 | 12/2010 | Crooks et al. | |
| 7,849,307 B2 | 12/2010 | Roskind | |
| 7,853,526 B2 | 12/2010 | Milana | |
| 7,853,533 B2 | 12/2010 | Eisen | |
| 7,856,372 B2 | 12/2010 | Ullah | |
| 7,860,783 B2 | 12/2010 | Yang et al. | |
| 7,861,260 B2 | 12/2010 | Shkedi | |
| 7,865,427 B2 | 1/2011 | Wright et al. | |
| 7,882,217 B2 | 2/2011 | Katzir | |
| 7,908,223 B2 | 3/2011 | Klein et al. | |
| 7,908,645 B2 | 3/2011 | Varghese et al. | |
| 7,930,285 B2 | 4/2011 | Abraham et al. | |
| 7,933,984 B1 | 4/2011 | Smith et al. | |
| 7,937,467 B2 | 5/2011 | Barber | |
| 7,940,929 B1 | 5/2011 | Sengupta | |
| 7,945,494 B2 | 5/2011 | Williams | |
| 7,945,515 B2 | 5/2011 | Zoldi et al. | |
| 7,949,564 B1 | 5/2011 | Hughes et al. | |
| 7,958,029 B1 | 6/2011 | Bobich et al. | |
| 7,958,246 B2 | 6/2011 | Barber | |
| 7,961,857 B2 | 6/2011 | Zoldi et al. | |
| 7,970,701 B2 | 6/2011 | Lewis et al. | |
| 7,983,490 B1 | 7/2011 | Minter | |
| 7,983,691 B1 | 7/2011 | Wong et al. | |
| 7,991,716 B2 | 8/2011 | Crooks et al. | |
| 7,995,996 B2 | 8/2011 | Link, II et al. | |
| 8,001,376 B2 | 8/2011 | Utin | |
| 8,001,597 B2 | 8/2011 | Crooks | |
| 8,015,614 B2 | 9/2011 | Matsuzaki et al. | |
| 8,015,921 B2 | 9/2011 | Leppanen et al. | |
| 8,019,678 B2 | 9/2011 | Wright et al. | |
| 8,020,763 B1 | 9/2011 | Kowalchyk et al. | |
| 8,024,266 B1 | 9/2011 | Barber | |
| 8,025,220 B2 | 9/2011 | Zoldi et al. | |
| 8,027,439 B2 | 9/2011 | Zoldi et al. | |
| 8,032,448 B2 | 10/2011 | Anderson et al. | |
| 8,037,097 B2 | 10/2011 | Guo et al. | |
| 8,037,511 B1 | 10/2011 | Lundy et al. | |
| 8,041,597 B2 | 10/2011 | Li et al. | |
| 8,042,164 B2 | 10/2011 | Sheynblat et al. | |
| 8,046,271 B2 | 10/2011 | Jimenez et al. | |
| 8,060,922 B2 | 11/2011 | Crichton et al. | |
| 8,065,233 B2 | 11/2011 | Lee et al. | |
| 8,090,648 B2 | 1/2012 | Zoldi et al. | |
| 8,108,378 B2 | 1/2012 | Ott, IV et al. | |
| 8,121,962 B2 | 2/2012 | Vaiciulis et al. | |
| 8,122,082 B2 | 2/2012 | Klein | |
| 8,126,816 B2 | 2/2012 | Mu et al. | |
| 8,131,615 B2 | 3/2012 | Diev et al. | |
| 8,140,689 B2 | 3/2012 | Barber | |
| 8,141,148 B2 | 3/2012 | Thomas et al. | |
| 8,145,560 B2 | 3/2012 | Kulkarni et al. | |
| 8,145,762 B2 | 3/2012 | Barber | |
| 8,150,968 B2 | 4/2012 | Barber | |
| 8,151,327 B2 | 4/2012 | Eisen | |
| 8,166,068 B2 | 4/2012 | Stevens | |
| 8,175,897 B2 | 5/2012 | Lee et al. | |
| 8,176,178 B2 | 5/2012 | Thomas et al. | |
| 8,180,686 B2 | 5/2012 | Ryu et al. | |
| 8,181,015 B2 | 5/2012 | Roskind | |
| 8,185,953 B2 | 5/2012 | Rothstein et al. | |
| 8,190,513 B2 | 5/2012 | Felger | |
| 8,190,529 B2 | 5/2012 | Abe et al. | |
| 8,191,148 B2 | 5/2012 | Oliver et al. | |
| 8,201,099 B1 | 6/2012 | Osbourn et al. | |
| 8,204,833 B2 | 6/2012 | Mu et al. | |
| 8,209,744 B2 | 6/2012 | Zhu et al. | |
| 8,209,760 B1 | 6/2012 | Hardman | |
| 8,213,898 B2 | 7/2012 | Choti et al. | |
| 8,214,232 B2 | 7/2012 | Tyler et al. | |
| 8,214,285 B2 | 7/2012 | Hu et al. | |
| 8,219,415 B2 | 7/2012 | Tyler et al. | |
| 8,224,308 B1 | 7/2012 | Gavrylyako et al. | |
| 8,224,348 B2 | 7/2012 | Bolon et al. | |
| 8,229,844 B2 | 7/2012 | Felger | |
| 8,250,631 B2 | 8/2012 | Iyengar et al. | |
| 8,266,295 B2 | 9/2012 | Klein et al. | |
| 8,271,891 B1 | 9/2012 | Osbourn et al. | |
| 8,280,833 B2 | 10/2012 | Miltonberger | |
| 8,290,838 B1 | 10/2012 | Thakur et al. | |
| 8,295,898 B2 | 10/2012 | Ashfield et al. | |
| 8,296,228 B1 | 10/2012 | Kloor | |
| 8,296,229 B1 | 10/2012 | Yellin et al. | |
| 8,296,245 B2 | 10/2012 | Barber et al. | |
| 8,296,250 B2 | 10/2012 | Crooks et al. | |
| 8,306,933 B2 | 11/2012 | Kawai et al. | |
| 8,307,430 B1 | 11/2012 | Chen et al. | |
| 8,311,907 B2 | 11/2012 | Klein et al. | |

(56) References Cited

U.S. PATENT DOCUMENTS

| | | | |
|---|---|---|---|
| 8,321,269 | B2 | 11/2012 | Linden et al. |
| 8,326,759 | B2 | 12/2012 | Hammad |
| 8,326,760 | B2 | 12/2012 | Ma et al. |
| 8,326,763 | B2 | 12/2012 | Zuili |
| 8,332,338 | B2 | 12/2012 | Vaiciulis et al. |
| 8,332,522 | B2 | 12/2012 | Barber |
| 8,370,253 | B1 | 2/2013 | Grossman et al. |
| 8,370,638 | B2 | 2/2013 | Duane et al. |
| 8,380,831 | B2 | 2/2013 | Barber |
| 8,392,987 | B2 | 3/2013 | Sasamura et al. |
| 8,407,112 | B2 | 3/2013 | Walter |
| 8,407,798 | B1 | 3/2013 | Lotem et al. |
| 8,417,587 | B2 | 4/2013 | Jimenez et al. |
| 8,423,458 | B2 | 4/2013 | Barber |
| 8,424,061 | B2 | 4/2013 | Rosenor |
| 8,429,070 | B2 | 4/2013 | Hu et al. |
| 8,438,134 | B2 | 5/2013 | Wang et al. |
| 8,438,184 | B1 | 5/2013 | Wang |
| 8,443,202 | B2 | 5/2013 | White et al. |
| 8,452,715 | B2 | 5/2013 | Barber |
| 8,453,226 | B2 | 5/2013 | Hammad |
| 8,462,161 | B1 | 6/2013 | Barber |
| 8,464,290 | B2 | 6/2013 | Beyda et al. |
| 8,468,582 | B2 | 6/2013 | Kuang et al. |
| 8,484,470 | B2 | 7/2013 | Sakakihara et al. |
| 8,495,714 | B2 | 7/2013 | Jones et al. |
| 8,516,439 | B2 | 8/2013 | Brass et al. |
| 8,539,070 | B2 | 9/2013 | Barber |
| 8,543,522 | B2 | 9/2013 | Ryman-Tubb et al. |
| 8,548,137 | B2 | 10/2013 | Zoldi et al. |
| 8,559,607 | B2 | 10/2013 | Zoldi et al. |
| 8,567,669 | B2 | 10/2013 | Griegel et al. |
| 8,588,816 | B2 | 11/2013 | Collins |
| 8,601,109 | B2 | 12/2013 | Johannsen |
| 8,611,856 | B2 | 12/2013 | Yan et al. |
| 8,612,854 | B2 | 12/2013 | Eisen et al. |
| 8,620,942 | B1 | 12/2013 | Hoffman et al. |
| 8,631,006 | B1 | 1/2014 | Haveliwala et al. |
| 8,660,539 | B2 | 2/2014 | Khambete et al. |
| 8,661,119 | B1 | 2/2014 | Jindal et al. |
| 8,676,684 | B2 | 3/2014 | Newman et al. |
| 8,677,398 | B2 | 3/2014 | Shkedi |
| 8,683,561 | B2 | 3/2014 | Utin |
| 8,688,543 | B2 | 4/2014 | Dominguez |
| 8,701,168 | B2 | 4/2014 | Sastry et al. |
| 8,701,170 | B1 | 4/2014 | Barber |
| 8,725,570 | B2 | 5/2014 | Doughty et al. |
| 8,751,815 | B2 | 6/2014 | Lunde et al. |
| 8,762,283 | B2 | 6/2014 | Gerber et al. |
| 8,762,574 | B2 | 6/2014 | Barber |
| 8,763,113 | B2 | 6/2014 | Thomas et al. |
| 8,776,225 | B2 | 7/2014 | Pierson et al. |
| 8,779,981 | B2 | 7/2014 | Eisen et al. |
| 8,781,975 | B2 | 7/2014 | Bennett et al. |
| 8,782,783 | B2 | 7/2014 | Thomas et al. |
| 8,799,458 | B2 | 8/2014 | Barber |
| 8,817,984 | B2 | 8/2014 | Miller et al. |
| 8,826,393 | B2 | 9/2014 | Eisen |
| 8,838,478 | B2 | 9/2014 | Kretz et al. |
| 8,838,967 | B1 | 9/2014 | Mills et al. |
| 8,862,514 | B2 | 10/2014 | Eisen |
| 8,862,526 | B2 | 10/2014 | Miltonberger |
| 8,874,735 | B2 | 10/2014 | Barber |
| 8,880,097 | B1 | 11/2014 | Xu et al. |
| 8,881,288 | B1 | 11/2014 | Levy et al. |
| 8,938,671 | B2 | 1/2015 | Eisen et al. |
| 8,954,560 | B2 | 2/2015 | Johannsen |
| 8,966,276 | B2 | 2/2015 | Nanopoulos et al. |
| 9,037,483 | B1 | 5/2015 | Curcio et al. |
| 9,038,153 | B2 | 5/2015 | Barber |
| 9,060,012 | B2 | 6/2015 | Eisen |
| 9,075,896 | B2 | 7/2015 | Barber |
| 9,083,735 | B2 | 7/2015 | Reumann et al. |
| 9,098,617 | B1 | 8/2015 | Pauley, Jr. et al. |
| 9,112,850 | B1 | 8/2015 | Eisen |
| 9,118,646 | B2 | 8/2015 | Pierson et al. |
| 9,172,691 | B2 | 10/2015 | Barber |
| 9,177,293 | B1 | 11/2015 | Gagnon et al. |
| 9,183,567 | B2 | 11/2015 | Barber |
| 9,191,370 | B2 | 11/2015 | Barber et al. |
| 9,196,004 | B2 | 11/2015 | Eisen |
| 9,202,039 | B2 | 12/2015 | Dandu et al. |
| 9,203,837 | B2 | 12/2015 | Pierson et al. |
| 9,294,448 | B2 | 3/2016 | Miller et al. |
| 9,298,677 | B2 | 3/2016 | Tollinger et al. |
| 9,332,020 | B2 | 5/2016 | Thomas et al. |
| 9,361,597 | B2 | 6/2016 | Britton et al. |
| 9,378,500 | B2 | 6/2016 | Jimenez et al. |
| 9,390,384 | B2 | 7/2016 | Eisen |
| 9,396,331 | B2 | 7/2016 | Eisen et al. |
| 9,412,123 | B2 | 8/2016 | Eisen |
| 9,477,968 | B2 | 10/2016 | Barber |
| 9,514,248 | B1 | 12/2016 | Guan et al. |
| 9,514,446 | B1 | 12/2016 | Rajkumar et al. |
| 9,521,161 | B2 | 12/2016 | Reumann et al. |
| 9,521,551 | B2 | 12/2016 | Eisen et al. |
| 9,559,852 | B2 | 1/2017 | Miller et al. |
| 9,603,016 | B1 | 3/2017 | Mills et al. |
| 9,633,201 | B1 | 4/2017 | Katz |
| 9,699,164 | B2 | 7/2017 | Barber |
| 9,702,961 | B2 | 7/2017 | Shields |
| 9,703,983 | B2 | 7/2017 | Eisen et al. |
| 9,712,497 | B2 | 7/2017 | Barber et al. |
| 9,722,968 | B2 | 8/2017 | Barber |
| 9,754,256 | B2 | 9/2017 | Britton et al. |
| 9,754,311 | B2 | 9/2017 | Eisen |
| 9,781,151 | B1 | 10/2017 | McCorkendale et al. |
| 9,785,973 | B2 | 10/2017 | Tollinger et al. |
| 9,916,393 | B2 | 3/2018 | Barber |
| 9,948,629 | B2 | 4/2018 | Eisen |
| 9,990,631 | B2 | 6/2018 | Eisen |
| 10,021,099 | B2 | 7/2018 | Eisen et al. |
| 10,037,529 | B2 | 7/2018 | Barber |
| 10,089,679 | B2 | 10/2018 | Eisen |
| 10,091,312 | B1 | 10/2018 | Khanwalkar et al. |
| 10,123,368 | B2 | 11/2018 | Gundavelli et al. |
| 10,231,120 | B2 | 3/2019 | Nethi et al. |
| 10,248,968 | B2 | 4/2019 | Sivaramakrishnan et al. |
| 10,290,017 | B2 | 5/2019 | Traasdahl et al. |
| 10,305,880 | B2 | 5/2019 | Barber |
| 10,321,309 | B2 | 6/2019 | Lee et al. |
| 10,339,306 | B1 | 7/2019 | Katz |
| 10,341,344 | B2 | 7/2019 | Eisen et al. |
| 10,395,252 | B2 | 8/2019 | Eisen |
| 10,402,854 | B2 | 9/2019 | Barber |
| 10,417,637 | B2 | 9/2019 | Eisen |
| 10,425,379 | B2 | 9/2019 | Barber |
| 10,453,066 | B2 | 10/2019 | Eisen |
| 10,510,094 | B2 | 12/2019 | Sivaramakrishnan et al. |
| 10,535,093 | B2 | 1/2020 | Eisen |
| 10,616,201 | B2 | 4/2020 | Eisen |
| 10,642,899 | B2 | 5/2020 | Barber |
| 10,679,216 | B2 | 6/2020 | Barber |
| 10,691,751 | B2 | 6/2020 | Atlas et al. |
| 10,726,151 | B2 | 7/2020 | Eisen et al. |
| 10,728,350 | B1 | 7/2020 | Khanwalkar et al. |
| 10,754,913 | B2 | 8/2020 | Liodden et al. |
| 10,853,813 | B2 | 12/2020 | Eisen |
| 10,862,889 | B2 | 12/2020 | Eisen et al. |
| 10,902,327 | B1 | 1/2021 | Yalov et al. |
| 10,956,732 | B2 | 3/2021 | Henaff |
| 10,984,128 | B1 | 4/2021 | Hoffer |
| 10,999,298 | B2 | 5/2021 | Eisen |
| 11,010,468 | B1 | 5/2021 | Katz |
| 11,095,643 | B2 | 8/2021 | Huffman et al. |
| 11,176,200 | B2 | 11/2021 | Barber |
| 11,176,573 | B2 | 11/2021 | Barber |
| 11,177,967 | B2 | 11/2021 | Pala |
| 11,195,225 | B2 | 12/2021 | Eisen |
| 11,223,621 | B2 | 1/2022 | Cano et al. |
| 11,238,456 | B2 | 2/2022 | Eisen |
| 11,240,326 | B1 | 2/2022 | Khanwalkar et al. |
| 11,301,585 | B2 | 4/2022 | Eisen et al. |
| 11,301,860 | B2 | 4/2022 | Eisen |

(56) References Cited

U.S. PATENT DOCUMENTS

| | | |
|---|---|---|
| 11,314,838 B2 | 4/2022 | Liodden et al. |
| 11,410,179 B2 | 8/2022 | Eisen |
| 2001/0011243 A1 | 8/2001 | Dembo et al. |
| 2001/0011304 A1 | 8/2001 | Wesigner et al. |
| 2001/0016840 A1 | 8/2001 | Hijikata et al. |
| 2001/0016876 A1 | 8/2001 | Kurth et al. |
| 2001/0018739 A1 | 8/2001 | Anderson et al. |
| 2001/0034712 A1 | 10/2001 | Colvin |
| 2001/0046096 A1 | 11/2001 | Worden |
| 2002/0035622 A1 | 3/2002 | Barber |
| 2002/0041328 A1 | 4/2002 | LeCompte et al. |
| 2002/0046157 A1 | 4/2002 | Solomon |
| 2002/0052852 A1 | 5/2002 | Bozeman |
| 2002/0056042 A1 | 5/2002 | van der Kaay et al. |
| 2002/0073046 A1 | 6/2002 | David |
| 2002/0073327 A1 | 6/2002 | Vellandi |
| 2002/0083079 A1 | 6/2002 | Meier et al. |
| 2002/0107853 A1 | 8/2002 | Hofmann et al. |
| 2002/0112171 A1 | 8/2002 | Ginter et al. |
| 2002/0128917 A1 | 9/2002 | Grounds |
| 2002/0138335 A1 | 9/2002 | Palmer et al. |
| 2002/0138577 A1 | 9/2002 | Teng et al. |
| 2002/0153424 A1 | 10/2002 | Li |
| 2002/0156724 A1 | 10/2002 | Levchin et al. |
| 2002/0156836 A1 | 10/2002 | Janosik, Jr. et al. |
| 2002/0166063 A1 | 11/2002 | Lachman et al. |
| 2002/0167965 A1 | 11/2002 | Beasley et al. |
| 2003/0002732 A1 | 1/2003 | Gossett et al. |
| 2003/0002740 A1 | 1/2003 | Melikian et al. |
| 2003/0014327 A1 | 1/2003 | Skantze |
| 2003/0033161 A1 | 2/2003 | Walker et al. |
| 2003/0033356 A1 | 2/2003 | Tran et al. |
| 2003/0070080 A1 | 4/2003 | Rosen |
| 2003/0074301 A1 | 4/2003 | Solomon |
| 2003/0076242 A1 | 4/2003 | Burns et al. |
| 2003/0105707 A1 | 6/2003 | Audebert et al. |
| 2003/0105854 A1 | 6/2003 | Thorsteinsson et al. |
| 2003/0113033 A1 | 6/2003 | Huang |
| 2003/0115334 A1 | 6/2003 | Bhat et al. |
| 2003/0115481 A1 | 6/2003 | Baird et al. |
| 2003/0120543 A1* | 6/2003 | Carey ............... H04L 61/00 705/14.52 |
| 2003/0120586 A1* | 6/2003 | Litty ............... G06Q 40/025 705/38 |
| 2003/0140258 A1 | 7/2003 | Nelson et al. |
| 2003/0140283 A1* | 7/2003 | Nishio ............... H04L 61/58 714/43 |
| 2003/0154214 A1 | 8/2003 | Tu et al. |
| 2003/0158751 A1 | 8/2003 | Suresh et al. |
| 2003/0163359 A1 | 8/2003 | Kanesaka |
| 2003/0163398 A1 | 8/2003 | Yoshioka et al. |
| 2003/0163413 A1 | 8/2003 | Wiczkowski |
| 2003/0172036 A1 | 9/2003 | Feigenbaum |
| 2003/0182551 A1 | 9/2003 | Frantz et al. |
| 2003/0208684 A1 | 11/2003 | Camacho et al. |
| 2003/0212618 A1* | 11/2003 | Keyes ............... G06Q 40/025 705/38 |
| 2003/0233553 A1 | 12/2003 | Parks et al. |
| 2003/0237000 A1* | 12/2003 | Denton ............... H04W 12/12 709/224 |
| 2004/0001044 A1 | 1/2004 | Luciani et al. |
| 2004/0004733 A1 | 1/2004 | Barker et al. |
| 2004/0006553 A1 | 1/2004 | de Vries et al. |
| 2004/0010682 A1 | 1/2004 | Foster et al. |
| 2004/0027385 A1 | 2/2004 | Rekimoto et al. |
| 2004/0030912 A1 | 2/2004 | Merkle, Jr. et al. |
| 2004/0034652 A1 | 2/2004 | Hofmann et al. |
| 2004/0034794 A1 | 2/2004 | Mayer et al. |
| 2004/0066023 A1 | 4/2004 | Joseph |
| 2004/0073809 A1 | 4/2004 | Wing Keong |
| 2004/0088313 A1 | 5/2004 | Torres |
| 2004/0098618 A1 | 5/2004 | Kim et al. |
| 2004/0105431 A1* | 6/2004 | Monjas-Llorente .... H04L 67/14 370/352 |
| 2004/0111621 A1 | 6/2004 | Himberger et al. |
| 2004/0111632 A1 | 6/2004 | Halperin |
| 2004/0117321 A1 | 6/2004 | Sancho |
| 2004/0139008 A1 | 7/2004 | Mascavaage III |
| 2004/0153644 A1 | 8/2004 | McCorkendale et al. |
| 2004/0159699 A1* | 8/2004 | Nelson ............... G06Q 20/20 235/379 |
| 2004/0166857 A1 | 8/2004 | Shim et al. |
| 2004/0171381 A1* | 9/2004 | Inselberg ............... H04H 60/74 455/426.2 |
| 2004/0181598 A1 | 9/2004 | Paya et al. |
| 2004/0187023 A1 | 9/2004 | Alagna et al. |
| 2004/0203750 A1 | 10/2004 | Cowdrey et al. |
| 2004/0230820 A1 | 11/2004 | Hui Hsu et al. |
| 2004/0236696 A1 | 11/2004 | Aoki et al. |
| 2004/0236702 A1 | 11/2004 | Fink et al. |
| 2004/0254890 A1 | 12/2004 | Sancho et al. |
| 2004/0260876 A1 | 12/2004 | Singh et al. |
| 2004/0260922 A1 | 12/2004 | Goodman et al. |
| 2005/0008148 A1 | 1/2005 | Jacobson |
| 2005/0015601 A1* | 1/2005 | Tabi ............... G06F 21/6227 713/182 |
| 2005/0021360 A1 | 1/2005 | Miller et al. |
| 2005/0022020 A1 | 1/2005 | Fremberg et al. |
| 2005/0033653 A1 | 2/2005 | Eisenberg et al. |
| 2005/0033703 A1 | 2/2005 | Holdsworth |
| 2005/0039034 A1 | 2/2005 | Doyle et al. |
| 2005/0039219 A1 | 2/2005 | Cooper et al. |
| 2005/0074015 A1* | 4/2005 | Chari ............... H04L 12/2856 370/400 |
| 2005/0076230 A1 | 4/2005 | Redenbaugh et al. |
| 2005/0085931 A1 | 4/2005 | Willeby |
| 2005/0097320 A1 | 5/2005 | Golan et al. |
| 2005/0108177 A1 | 5/2005 | Sancho |
| 2005/0111054 A1 | 5/2005 | Umeda |
| 2005/0113092 A1 | 5/2005 | Coppinger et al. |
| 2005/0131826 A1 | 6/2005 | Cook |
| 2005/0154676 A1 | 7/2005 | Ronning et al. |
| 2005/0165643 A1 | 7/2005 | Wilson et al. |
| 2005/0185225 A1 | 8/2005 | Brawn et al. |
| 2005/0187883 A1 | 8/2005 | Bishop et al. |
| 2005/0188423 A1 | 8/2005 | Motsinger et al. |
| 2005/0204159 A1 | 9/2005 | Davis et al. |
| 2005/0210533 A1 | 9/2005 | Copeland et al. |
| 2005/0216278 A1 | 9/2005 | Eisen |
| 2005/0246551 A1 | 11/2005 | Dondl et al. |
| 2005/0278542 A1 | 12/2005 | Pierson et al. |
| 2006/0008779 A1 | 1/2006 | Shand et al. |
| 2006/0010072 A1 | 1/2006 | Eisen |
| 2006/0026669 A1 | 2/2006 | Zakas |
| 2006/0031938 A1 | 2/2006 | Choi |
| 2006/0048211 A1 | 3/2006 | Pierson et al. |
| 2006/0064346 A1 | 3/2006 | Steenstra et al. |
| 2006/0069619 A1 | 3/2006 | Walker et al. |
| 2006/0075492 A1 | 4/2006 | Golan et al. |
| 2006/0080263 A1 | 4/2006 | Willis et al. |
| 2006/0126829 A1 | 6/2006 | Lai |
| 2006/0130132 A1 | 6/2006 | Dharmarajan |
| 2006/0136294 A1 | 6/2006 | Linden et al. |
| 2006/0155985 A1 | 7/2006 | Canard et al. |
| 2006/0161501 A1 | 7/2006 | Waserstein et al. |
| 2006/0176984 A1 | 8/2006 | Lee et al. |
| 2006/0190331 A1 | 8/2006 | Tollinger et al. |
| 2006/0190489 A1 | 8/2006 | Vohariwatt et al. |
| 2006/0200855 A1 | 9/2006 | Willis |
| 2006/0200856 A1 | 9/2006 | Salowey et al. |
| 2006/0224898 A1 | 10/2006 | Ahmed |
| 2006/0237531 A1 | 10/2006 | Heffez et al. |
| 2006/0253327 A1 | 11/2006 | Morris et al. |
| 2006/0253328 A1 | 11/2006 | Kohli et al. |
| 2006/0264202 A1 | 11/2006 | Hagmeier et al. |
| 2006/0281541 A1 | 12/2006 | Nguyen et al. |
| 2006/0282660 A1 | 12/2006 | Varghese et al. |
| 2006/0284838 A1 | 12/2006 | Tsatalos et al. |
| 2006/0287902 A1 | 12/2006 | Helsper et al. |
| 2007/0011078 A1 | 1/2007 | Jain et al. |
| 2007/0026942 A1* | 2/2007 | Kinsley ............... G07F 17/3269 463/29 |
| 2007/0030528 A1 | 2/2007 | Quaeler et al. |

(56) References Cited

U.S. PATENT DOCUMENTS

| | | |
|---|---|---|
| 2007/0038568 A1 | 2/2007 | Greene et al. |
| 2007/0043837 A1 | 2/2007 | Kruse et al. |
| 2007/0061211 A1 | 3/2007 | Ramer et al. |
| 2007/0061273 A1 | 3/2007 | Greene et al. |
| 2007/0073630 A1 | 3/2007 | Greene et al. |
| 2007/0094594 A1 | 4/2007 | Matichuk et al. |
| 2007/0097076 A1 | 5/2007 | Gross |
| 2007/0097976 A1 | 5/2007 | Wood et al. |
| 2007/0101405 A1 | 5/2007 | Engle et al. |
| 2007/0107059 A1 | 5/2007 | Chasin et al. |
| 2007/0118892 A1 | 5/2007 | Sastry et al. |
| 2007/0124246 A1 | 5/2007 | Lawyer et al. |
| 2007/0162763 A1 | 7/2007 | Bender et al. |
| 2007/0198410 A1 | 8/2007 | Labgold et al. |
| 2007/0199054 A1 | 8/2007 | Florencio et al. |
| 2007/0204044 A1 | 8/2007 | Rice et al. |
| 2007/0208619 A1 | 9/2007 | Branam et al. |
| 2007/0214151 A1 | 9/2007 | Scott et al. |
| 2007/0220594 A1 | 9/2007 | Tulsyan |
| 2007/0233599 A1 | 10/2007 | Ganesan et al. |
| 2007/0233759 A1 | 10/2007 | Tomlinson et al. |
| 2007/0234070 A1 | 10/2007 | Horning et al. |
| 2007/0239604 A1 | 10/2007 | O'Connell et al. |
| 2007/0239606 A1 | 10/2007 | Eisen |
| 2007/0255821 A1 | 11/2007 | Ge et al. |
| 2007/0266257 A1 | 11/2007 | Camaisa et al. |
| 2007/0271466 A1 | 11/2007 | Mak |
| 2007/0294401 A1 | 12/2007 | Shkedi |
| 2007/0297459 A1* | 12/2007 | Cucos .............. H04J 3/07 370/505 |
| 2008/0002725 A1 | 1/2008 | Alicherry et al. |
| 2008/0005394 A1 | 1/2008 | Crooks |
| 2008/0010367 A1 | 1/2008 | Cheng et al. |
| 2008/0010678 A1 | 1/2008 | Burdette et al. |
| 2008/0015988 A1 | 1/2008 | Brown et al. |
| 2008/0021801 A1 | 1/2008 | Song et al. |
| 2008/0040653 A1 | 2/2008 | Levine |
| 2008/0040802 A1 | 2/2008 | Pierson et al. |
| 2008/0043634 A1 | 2/2008 | Wang et al. |
| 2008/0045201 A1 | 2/2008 | Kies |
| 2008/0046562 A1 | 2/2008 | Butler |
| 2008/0049779 A1 | 2/2008 | Hopmann et al. |
| 2008/0052629 A1 | 2/2008 | Phillips et al. |
| 2008/0098222 A1 | 4/2008 | Zilberman |
| 2008/0101277 A1 | 5/2008 | Taylor |
| 2008/0104070 A1 | 5/2008 | Lonchar |
| 2008/0104672 A1 | 5/2008 | Lunde et al. |
| 2008/0104684 A1 | 5/2008 | Lunde et al. |
| 2008/0109307 A1 | 5/2008 | Ullah |
| 2008/0120195 A1 | 5/2008 | Shakkarwar |
| 2008/0120214 A1 | 5/2008 | Steele et al. |
| 2008/0121690 A1 | 5/2008 | Carani et al. |
| 2008/0126180 A1 | 5/2008 | Ullah |
| 2008/0133420 A1 | 6/2008 | Barber |
| 2008/0162200 A1 | 7/2008 | O'Sullivan et al. |
| 2008/0162202 A1 | 7/2008 | Khanna et al. |
| 2008/0162475 A1 | 7/2008 | Meggs |
| 2008/0163128 A1 | 7/2008 | Callanan et al. |
| 2008/0184355 A1 | 7/2008 | Walrath et al. |
| 2008/0184372 A1 | 7/2008 | Hoshina |
| 2008/0189790 A1 | 8/2008 | Park |
| 2008/0191007 A1 | 8/2008 | Keay |
| 2008/0201214 A1 | 8/2008 | Aaron |
| 2008/0204788 A1 | 8/2008 | Kelly et al. |
| 2008/0222706 A1 | 9/2008 | Renaud et al. |
| 2008/0235623 A1 | 9/2008 | Li |
| 2008/0239365 A1 | 10/2008 | Salgado et al. |
| 2008/0249820 A1 | 10/2008 | Pathria et al. |
| 2008/0255944 A1 | 10/2008 | Shah et al. |
| 2008/0281606 A1 | 11/2008 | Kitts |
| 2008/0281941 A1 | 11/2008 | Park et al. |
| 2008/0288299 A1 | 11/2008 | Schultz |
| 2008/0301281 A1 | 12/2008 | Wang et al. |
| 2008/0306830 A1 | 12/2008 | Lasa et al. |
| 2008/0313079 A1 | 12/2008 | Van Bosch et al. |
| 2008/0319774 A1 | 12/2008 | O'Sullivan et al. |
| 2008/0319841 A1 | 12/2008 | Oliver et al. |
| 2009/0017805 A1 | 1/2009 | Sarukkai et al. |
| 2009/0018940 A1 | 1/2009 | Wang et al. |
| 2009/0024971 A1 | 1/2009 | Willner et al. |
| 2009/0037213 A1 | 2/2009 | Eisen |
| 2009/0037602 A1 | 2/2009 | Patel et al. |
| 2009/0044279 A1 | 2/2009 | Crawford et al. |
| 2009/0044282 A1 | 2/2009 | Govindaraju |
| 2009/0055398 A1 | 2/2009 | Zhu et al. |
| 2009/0055929 A1* | 2/2009 | Lee .............. H04L 61/4511 707/E17.014 |
| 2009/0070664 A1 | 3/2009 | Gavin et al. |
| 2009/0089869 A1 | 4/2009 | Varghese |
| 2009/0106413 A1 | 4/2009 | Salo |
| 2009/0138590 A1 | 5/2009 | Lee et al. |
| 2009/0138593 A1 | 5/2009 | Kalavade |
| 2009/0157417 A1 | 6/2009 | Bradley et al. |
| 2009/0164269 A1 | 6/2009 | Gupta et al. |
| 2009/0171760 A1 | 7/2009 | Aarnio et al. |
| 2009/0177692 A1 | 7/2009 | Chagoly et al. |
| 2009/0183010 A1 | 7/2009 | Schnell et al. |
| 2009/0187625 A1 | 7/2009 | Blackstock et al. |
| 2009/0198629 A1 | 8/2009 | De Prisco et al. |
| 2009/0205031 A1 | 8/2009 | Sato et al. |
| 2009/0222308 A1 | 9/2009 | Zoldi et al. |
| 2009/0228340 A1 | 9/2009 | Bohannon |
| 2009/0228585 A1 | 9/2009 | Kosbab et al. |
| 2009/0234738 A1 | 9/2009 | Britton et al. |
| 2009/0241174 A1 | 9/2009 | Rajan et al. |
| 2009/0254430 A1 | 10/2009 | Cherenson |
| 2009/0260064 A1 | 10/2009 | Mcdowell et al. |
| 2009/0265773 A1 | 10/2009 | Schultz |
| 2009/0271306 A1 | 10/2009 | Pierson |
| 2009/0307141 A1 | 10/2009 | Kongalath et al. |
| 2009/0280777 A1 | 11/2009 | Doherty |
| 2009/0292568 A1 | 11/2009 | Khosravani et al. |
| 2009/0293128 A1 | 11/2009 | Lippmann et al. |
| 2009/0296907 A1 | 12/2009 | Vendrow et al. |
| 2009/0298480 A1 | 12/2009 | Khambete et al. |
| 2009/0307119 A1 | 12/2009 | Ahles et al. |
| 2009/0313134 A1 | 12/2009 | Faith et al. |
| 2009/0327333 A1 | 12/2009 | Diener et al. |
| 2010/0004965 A1 | 1/2010 | Eisen |
| 2010/0005013 A1 | 1/2010 | Uriarte |
| 2010/0030641 A1 | 2/2010 | Ibenforth |
| 2010/0030777 A1 | 2/2010 | Panwar et al. |
| 2010/0057623 A1 | 3/2010 | Kapur et al. |
| 2010/0057843 A1 | 3/2010 | Landsman et al. |
| 2010/0070606 A1 | 3/2010 | Shenfield et al. |
| 2010/0082136 A1 | 4/2010 | Rosenblatt et al. |
| 2010/0082972 A1 | 4/2010 | Benco et al. |
| 2010/0094767 A1 | 4/2010 | Miltonberger |
| 2010/0094768 A1 | 4/2010 | Miltonberger |
| 2010/0106611 A1 | 4/2010 | Paulsen et al. |
| 2010/0107225 A1 | 4/2010 | Spencer et al. |
| 2010/0121716 A1 | 5/2010 | Golan |
| 2010/0138299 A1 | 6/2010 | Preston et al. |
| 2010/0145960 A1 | 6/2010 | Casteel et al. |
| 2010/0153540 A1 | 6/2010 | Li et al. |
| 2010/0157848 A1 | 6/2010 | Das et al. |
| 2010/0161424 A1 | 6/2010 | Sylvain |
| 2010/0161566 A1 | 6/2010 | Adair et al. |
| 2010/0161728 A1 | 6/2010 | Drozt et al. |
| 2010/0169157 A1 | 7/2010 | Muhonen et al. |
| 2010/0169192 A1 | 7/2010 | Zoldi et al. |
| 2010/0192082 A1 | 7/2010 | Sodah |
| 2010/0199332 A1 | 8/2010 | Bachmann et al. |
| 2010/0199338 A1 | 8/2010 | Craddock et al. |
| 2010/0211464 A1 | 8/2010 | Zhu et al. |
| 2010/0223105 A1 | 9/2010 | Gassewitz et al. |
| 2010/0223145 A1 | 9/2010 | Dragt |
| 2010/0228624 A1 | 9/2010 | Morris et al. |
| 2010/0228625 A1 | 9/2010 | Priyadarshan et al. |
| 2010/0228638 A1 | 9/2010 | Mikan et al. |
| 2010/0235220 A1 | 9/2010 | Guha et al. |
| 2010/0257065 A1 | 10/2010 | Gupta et al. |
| 2010/0262467 A1 | 10/2010 | Barnhill, Jr. et al. |
| 2010/0274678 A1 | 10/2010 | Rolf et al. |

(56) References Cited

U.S. PATENT DOCUMENTS

| | | |
|---|---|---|
| 2010/0293094 A1 | 11/2010 | Kolkowitz et al. |
| 2010/0306827 A1 | 12/2010 | Esteve Balducci et al. |
| 2010/0313009 A1 | 12/2010 | Combet et al. |
| 2010/0321296 A1 | 12/2010 | Gross |
| 2010/0333170 A1 | 12/2010 | Cox et al. |
| 2011/0015497 A1 | 1/2011 | Eggenberger et al. |
| 2011/0022483 A1 | 1/2011 | Hammad |
| 2011/0022517 A1 | 1/2011 | Hammad |
| 2011/0023115 A1 | 1/2011 | Wright |
| 2011/0029339 A1 | 2/2011 | Callahan |
| 2011/0035302 A1 | 2/2011 | Martell et al. |
| 2011/0047072 A1 | 2/2011 | Ciurea |
| 2011/0055627 A1 | 3/2011 | Zawacki et al. |
| 2011/0082768 A1 | 4/2011 | Eisen |
| 2011/0082858 A1 | 4/2011 | Yu et al. |
| 2011/0106610 A1 | 5/2011 | Landis et al. |
| 2011/0112901 A1 | 5/2011 | Fried et al. |
| 2011/0119267 A1 | 5/2011 | Forman et al. |
| 2011/0153426 A1 | 6/2011 | Reddy et al. |
| 2011/0161228 A1 | 6/2011 | Suzuki et al. |
| 2011/0173281 A1 | 7/2011 | Smith |
| 2011/0184778 A1 | 7/2011 | Graepel et al. |
| 2011/0194679 A1 | 8/2011 | Patisaul et al. |
| 2011/0218860 A1 | 9/2011 | Barber |
| 2011/0225091 A1 | 9/2011 | Plastina et al. |
| 2011/0238575 A1 | 9/2011 | Nightengale et al. |
| 2011/0251951 A1 | 10/2011 | Kolkowitz et al. |
| 2011/0258118 A1 | 10/2011 | Ciurea |
| 2011/0264612 A1 | 10/2011 | Ryman-Tubb et al. |
| 2011/0282778 A1 | 11/2011 | Wright et al. |
| 2011/0288932 A1 | 11/2011 | Marks et al. |
| 2011/0302087 A1 | 12/2011 | Crooks |
| 2011/0302096 A1 | 12/2011 | Lowry |
| 2011/0307341 A1 | 12/2011 | Zohar et al. |
| 2011/0313847 A1 | 12/2011 | Cao et al. |
| 2011/0314557 A1 | 12/2011 | Marshall |
| 2012/0022883 A1 | 1/2012 | Morrison |
| 2012/0030083 A1 | 2/2012 | Newman et al. |
| 2012/0030757 A1 | 2/2012 | Baikalov et al. |
| 2012/0030771 A1 | 2/2012 | Pierson et al. |
| 2012/0036042 A1 | 2/2012 | Graylin et al. |
| 2012/0036261 A1 | 2/2012 | Salazar et al. |
| 2012/0041841 A1 | 2/2012 | Hu et al. |
| 2012/0042361 A1 | 2/2012 | Wong et al. |
| 2012/0054136 A1 | 3/2012 | Maulik |
| 2012/0054847 A1 | 3/2012 | Schultz et al. |
| 2012/0059711 A1 | 3/2012 | Ramer et al. |
| 2012/0078708 A1 | 3/2012 | Taylor et al. |
| 2012/0084203 A1 | 4/2012 | Mehew et al. |
| 2012/0084860 A1 | 4/2012 | Cao et al. |
| 2012/0094639 A1 | 4/2012 | Carlson et al. |
| 2012/0096076 A1 | 4/2012 | Chan |
| 2012/0096557 A1 | 4/2012 | Britton et al. |
| 2012/0101939 A1 | 4/2012 | Kasower |
| 2012/0150742 A1 | 6/2012 | Poon et al. |
| 2012/0150750 A1 | 6/2012 | Law et al. |
| 2012/0157062 A1 | 6/2012 | Kim et al. |
| 2012/0158586 A1 | 6/2012 | Ganti et al. |
| 2012/0166533 A1 | 6/2012 | Rubinstein et al. |
| 2012/0173465 A1 | 7/2012 | Hore et al. |
| 2012/0179558 A1 | 7/2012 | Fischer |
| 2012/0197981 A1 | 8/2012 | Chan |
| 2012/0204262 A1 | 8/2012 | Thomas et al. |
| 2012/0215777 A1 | 8/2012 | Malik et al. |
| 2012/0215896 A1 | 8/2012 | Johannsen |
| 2012/0216282 A1 | 8/2012 | Pappu et al. |
| 2012/0221404 A1 | 8/2012 | Ahmed et al. |
| 2012/0221470 A1 | 8/2012 | Lyon |
| 2012/0222111 A1 | 8/2012 | Oliver et al. |
| 2012/0233640 A1 | 9/2012 | Odryna et al. |
| 2012/0233665 A1 | 9/2012 | Ranganathan et al. |
| 2012/0239553 A1 | 9/2012 | Gonen et al. |
| 2012/0239574 A1 | 9/2012 | Smith et al. |
| 2012/0239774 A1 | 9/2012 | Tola et al. |
| 2012/0254320 A1 | 10/2012 | Dove et al. |
| 2012/0271860 A1 | 10/2012 | Graham, Jr. et al. |
| 2012/0278127 A1 | 11/2012 | Kirakosyan et al. |
| 2012/0278321 A1 | 11/2012 | Traub et al. |
| 2012/0295580 A1 | 11/2012 | Corner |
| 2012/0297380 A1 | 11/2012 | Colbert et al. |
| 2012/0299925 A1 | 11/2012 | Najork et al. |
| 2012/0311162 A1 | 12/2012 | Paulsen et al. |
| 2012/0323788 A1 | 12/2012 | Keresman et al. |
| 2012/0323836 A1 | 12/2012 | Wright et al. |
| 2012/0324027 A1 | 12/2012 | Vaynblat et al. |
| 2012/0324060 A1 | 12/2012 | Afergan et al. |
| 2012/0330787 A1 | 12/2012 | Hanson et al. |
| 2013/0005299 A1 | 1/2013 | Raleigh |
| 2013/0006743 A1 | 1/2013 | Moore et al. |
| 2013/0018789 A1 | 1/2013 | Kaufmann |
| 2013/0018791 A1 | 1/2013 | Mendicino et al. |
| 2013/0024300 A1 | 1/2013 | Choudhuri et al. |
| 2013/0036304 A1 | 2/2013 | Lin et al. |
| 2013/0040603 A1 | 2/2013 | Stahlberg et al. |
| 2013/0042298 A1 | 2/2013 | Plaza Fonseca et al. |
| 2013/0054433 A1 | 2/2013 | Giard et al. |
| 2013/0055388 A1 | 2/2013 | Thomas et al. |
| 2013/0073463 A1 | 3/2013 | Dimmick et al. |
| 2013/0073473 A1 | 3/2013 | Heath |
| 2013/0080327 A1 | 3/2013 | Baldrick et al. |
| 2013/0085841 A1 | 4/2013 | Singleton et al. |
| 2013/0097673 A1 | 4/2013 | Meehan et al. |
| 2013/0097701 A1 | 4/2013 | Moyle et al. |
| 2013/0097706 A1 | 4/2013 | Titonis et al. |
| 2013/0103482 A1 | 4/2013 | Song et al. |
| 2013/0103629 A1 | 4/2013 | Vaiciulis et al. |
| 2013/0110623 A1 | 5/2013 | Kilroy et al. |
| 2013/0110637 A1 | 5/2013 | Bott |
| 2013/0111592 A1 | 5/2013 | Zhu et al. |
| 2013/0117832 A1 | 5/2013 | Gandhi |
| 2013/0124329 A1 | 5/2013 | Tengler |
| 2013/0124332 A1 | 5/2013 | Doughty et al. |
| 2013/0124333 A1 | 5/2013 | Doughty et al. |
| 2013/0144539 A1 | 6/2013 | Allen et al. |
| 2013/0148525 A1 | 6/2013 | Cuadra Sanchez et al. |
| 2013/0159192 A1 | 6/2013 | Partridge et al. |
| 2013/0159195 A1 | 6/2013 | Kirillin et al. |
| 2013/0185764 A1 | 7/2013 | Krstić et al. |
| 2013/0197998 A1 | 8/2013 | Buhrmann et al. |
| 2013/0198066 A1 | 8/2013 | Wall et al. |
| 2013/0204793 A1 | 8/2013 | Kerridge et al. |
| 2013/0217330 A1 | 8/2013 | Gardenfors et al. |
| 2013/0226692 A1 | 8/2013 | Kouladjie et al. |
| 2013/0226717 A1 | 8/2013 | Ahluwalia et al. |
| 2013/0253965 A1 | 9/2013 | Joseph |
| 2013/0273879 A1 | 10/2013 | Eisen et al. |
| 2013/0290119 A1 | 10/2013 | Howe et al. |
| 2013/0325601 A1 | 12/2013 | Shekhawat et al. |
| 2013/0326007 A1 | 12/2013 | Turner et al. |
| 2013/0339186 A1 | 12/2013 | French |
| 2013/0339848 A1 | 12/2013 | Patil et al. |
| 2014/0019542 A1 | 1/2014 | Rao et al. |
| 2014/0032902 A1 | 1/2014 | Agrawal et al. |
| 2014/0095320 A1 | 4/2014 | Sivaramakrishnan et al. |
| 2014/0114821 A1 | 4/2014 | Yoshioka et al. |
| 2014/0120864 A1 | 5/2014 | Manolarakis et al. |
| 2014/0122343 A1 | 5/2014 | Einav et al. |
| 2014/0122697 A1 | 5/2014 | Liu et al. |
| 2014/0129322 A1 | 5/2014 | George et al. |
| 2014/0148197 A1 | 5/2014 | Shields |
| 2014/0180802 A1 | 6/2014 | Boal |
| 2014/0197950 A1 | 7/2014 | Shupp et al. |
| 2014/0258125 A1 | 9/2014 | Gerber et al. |
| 2014/0289867 A1 | 9/2014 | Bukai |
| 2014/0361926 A1 | 12/2014 | Eisen et al. |
| 2015/0026027 A1 | 1/2015 | Priess et al. |
| 2015/0039596 A1 | 2/2015 | Stewart |
| 2015/0046989 A1 | 2/2015 | Oberheide et al. |
| 2015/0088980 A1 | 3/2015 | Lakes et al. |
| 2015/0106198 A1 | 4/2015 | Miller et al. |
| 2015/0106270 A1 | 4/2015 | Burrell et al. |
| 2015/0120717 A1 | 4/2015 | Kim et al. |
| 2015/0127825 A1 | 5/2015 | Johannsen |
| 2015/0142767 A1 | 5/2015 | Wu et al. |

(56) References Cited

U.S. PATENT DOCUMENTS

| | | |
|---|---|---|
| 2015/0161207 A1 | 6/2015 | Li et al. |
| 2015/0186901 A1 | 7/2015 | Miltonberger |
| 2015/0188897 A1 | 7/2015 | Grigorovici et al. |
| 2015/0193769 A1 | 7/2015 | Barber |
| 2015/0193821 A1 | 7/2015 | Izumori et al. |
| 2015/0235258 A1 | 8/2015 | Shah et al. |
| 2015/0235275 A1 | 8/2015 | Shah et al. |
| 2015/0242861 A9 | 8/2015 | Baldassano |
| 2015/0254658 A1 | 9/2015 | Bondesen et al. |
| 2015/0294316 A1 | 10/2015 | Eisen |
| 2015/0326517 A1 | 11/2015 | Block et al. |
| 2015/0350856 A1 | 12/2015 | Circosta et al. |
| 2016/0019546 A1 | 1/2016 | Eisen |
| 2016/0021084 A1 | 1/2016 | Eisen |
| 2016/0034954 A1 | 2/2016 | Tollinger et al. |
| 2016/0036782 A1 | 2/2016 | Jeffrey et al. |
| 2016/0125461 A1 | 5/2016 | Sivaramakrishnan et al. |
| 2016/0182657 A1 | 6/2016 | Mukherjee et al. |
| 2016/0246581 A1 | 8/2016 | Jimenez et al. |
| 2016/0275545 A1 | 9/2016 | Dasdan et al. |
| 2016/0321701 A1 | 11/2016 | Tollinger et al. |
| 2016/0328710 A1 | 11/2016 | Britton et al. |
| 2017/0039571 A1 | 2/2017 | Eisen |
| 2017/0053208 A1 | 2/2017 | Krishnamurthy et al. |
| 2017/0142106 A1 | 5/2017 | Eisen et al. |
| 2017/0364918 A1 | 12/2017 | Malhotra et al. |
| 2018/0089459 A1 | 3/2018 | Eisen et al. |
| 2018/0108029 A1 | 4/2018 | Sinha et al. |
| 2018/0121915 A1 | 5/2018 | Britton et al. |
| 2018/0227299 A1 | 8/2018 | Varon et al. |
| 2018/0262478 A1 | 9/2018 | Eisen |
| 2018/0322500 A1 | 11/2018 | Eisen |
| 2019/0028472 A1 | 1/2019 | Eisen |
| 2019/0340642 A1 | 11/2019 | Barber |
| 2019/0356659 A1 | 11/2019 | Eisen et al. |
| 2019/0370859 A1 | 12/2019 | Traasdahl et al. |
| 2020/0005315 A1 | 1/2020 | Eisen |
| 2020/0013064 A1 | 1/2020 | Eisen |
| 2020/0034845 A1 | 1/2020 | Eisen |
| 2020/0064444 A1 | 2/2020 | Regani et al. |
| 2020/0092287 A1 | 3/2020 | Cano et al. |
| 2020/0218763 A1 | 7/2020 | Barber |
| 2020/0226186 A1 | 7/2020 | Liodden et al. |
| 2020/0294086 A1 | 9/2020 | Traasdahl et al. |
| 2020/0380162 A1 | 12/2020 | Eisen et al. |
| 2021/0224811 A1 | 7/2021 | Eisen |
| 2021/0226950 A1 | 7/2021 | Eisen |
| 2021/0281580 A1 | 9/2021 | Eisen |
| 2021/0336955 A1 | 10/2021 | Huffman et al. |
| 2022/0043881 A1 | 2/2022 | Putnam et al. |
| 2022/0269818 A1 | 8/2022 | Eisen |
| 2022/0270100 A1 | 8/2022 | Eisen |
| 2023/0046734 A1 | 2/2023 | Eisen |

FOREIGN PATENT DOCUMENTS

| | | |
|---|---|---|
| EP | 0 645 692 | 3/1995 |
| EP | 0 923 039 | 6/1999 |
| EP | 1 067 792 | 1/2001 |
| EP | 1 209 935 | 5/2002 |
| EP | 1 256 911 | 11/2002 |
| EP | 1 201 070 B1 | 6/2006 |
| EP | 1 703 382 | 9/2006 |
| EP | 1 197 032 B1 | 8/2007 |
| EP | 2 154 891 | 2/2010 |
| EP | 2 323 091 | 5/2011 |
| EP | 3 583 758 | 4/2021 |
| EP | 3 937 456 | 1/2022 |
| GB | 2 491 101 | 11/2012 |
| GB | 2 492 604 | 1/2013 |
| JP | 05-257602 | 10/1993 |
| JP | 2000-020467 | 1/2000 |
| JP | 2000-099250 | 4/2000 |
| JP | 2000-137755 | 5/2000 |
| JP | 2000-242582 | 9/2000 |
| JP | 2000-276281 | 10/2000 |
| JP | 2002-007697 | 1/2002 |
| JP | 2002-297869 | 10/2002 |
| JP | 2002-304568 | 10/2002 |
| JP | 2003-050910 | 2/2003 |
| JP | 2005-063216 | 3/2005 |
| JP | 2005-115644 | 4/2005 |
| JP | 2005-135431 | 5/2005 |
| JP | 2006-004333 | 1/2006 |
| JP | 2007-018446 | 1/2007 |
| JP | 2007-041642 | 2/2007 |
| JP | 2007-272520 | 10/2007 |
| JP | 2007-282249 | 10/2007 |
| JP | 2008-022298 | 1/2008 |
| JP | 2008-065363 | 3/2008 |
| JP | 2008-171315 | 7/2008 |
| JP | 2008-535062 | 8/2008 |
| JP | 2008-535124 | 8/2008 |
| JP | 2008-242805 | 10/2008 |
| JP | 2008-243008 | 10/2008 |
| JP | 2008-257434 | 10/2008 |
| JP | 2008-269229 | 11/2008 |
| JP | 4202314 | 12/2008 |
| JP | 2009-017298 | 1/2009 |
| JP | 2009-048538 | 3/2009 |
| JP | 2009-512940 | 3/2009 |
| JP | 2009-122880 | 6/2009 |
| JP | 2009-175984 | 8/2009 |
| JP | 2009-271661 | 11/2009 |
| JP | 2010-020728 | 1/2010 |
| JP | 2010-061254 | 3/2010 |
| JP | 2010-122955 | 6/2010 |
| JP | 2010-122956 | 6/2010 |
| JP | 2010-146153 | 7/2010 |
| JP | 2010-225040 | 10/2010 |
| JP | 2010-250664 | 11/2010 |
| JP | 2011-065531 | 3/2011 |
| JP | 2011-134252 | 7/2011 |
| JP | 2011-159264 | 8/2011 |
| JP | 2011-159307 | 8/2011 |
| JP | 2011-524560 | 9/2011 |
| JP | 2011-210263 | 10/2011 |
| JP | 2012-234503 | 11/2012 |
| JP | 5191376 | 5/2013 |
| JP | 5216932 | 6/2013 |
| JP | 2015-503148 | 1/2015 |
| KR | 10-1999-0015738 | 3/1999 |
| KR | 10-0645983 | 11/2006 |
| KR | 10-2008-0044558 | 5/2008 |
| KR | 10-2009-0051977 | 9/2009 |
| KR | 10-2010-0085888 | 7/2010 |
| WO | WO 96/041488 | 12/1996 |
| WO | WO 97/003410 | 1/1997 |
| WO | WO 97/023816 | 7/1997 |
| WO | WO 99/050775 | 10/1999 |
| WO | WO 01/011450 | 2/2001 |
| WO | WO 01/033520 | 5/2001 |
| WO | WO 01/086877 | 11/2001 |
| WO | WO 01/095550 | 12/2001 |
| WO | WO 01/097134 | 12/2001 |
| WO | WO 02/001462 | 1/2002 |
| WO | WO 02/071176 | 9/2002 |
| WO | WO 02/091226 | 11/2002 |
| WO | WO 03/017155 | 2/2003 |
| WO | WO 03/025868 | 3/2003 |
| WO | WO 03/075197 | 9/2003 |
| WO | WO 03/075197 A3 | 12/2003 |
| WO | WO 02/037219 A9 | 5/2004 |
| WO | WO 2004/038997 | 5/2004 |
| WO | WO 2005/038818 | 4/2005 |
| WO | WO 2005/099166 | 10/2005 |
| WO | WO 2006/135367 | 12/2006 |
| WO | WO 2007/001394 | 1/2007 |
| WO | WO 2007/045818 | 4/2007 |
| WO | WO 2007/072238 | 6/2007 |
| WO | WO 2007/075573 | 7/2007 |
| WO | WO 2008/029828 | 3/2008 |
| WO | WO 2008/054849 | 5/2008 |
| WO | WO 2009/132148 | 10/2009 |

(56) References Cited

FOREIGN PATENT DOCUMENTS

| WO | WO 2011/081818 | 7/2011 |
|---|---|---|
| WO | WO 2011/104864 | 9/2011 |
| WO | WO 2012/054646 | 4/2012 |
| WO | WO 2012/061801 | 5/2012 |
| WO | WO 2012/142121 | 10/2012 |
| WO | WO 2012/142584 | 10/2012 |
| WO | WO 2013/006538 | 1/2013 |
| WO | WO 2013/070687 | 5/2013 |
| WO | WO 2013/074750 | 5/2013 |
| WO | WO 2013/142722 | 9/2013 |
| WO | WO 2014/022813 | 2/2014 |
| WO | WO 2014/078569 | 5/2014 |
| WO | WO 2017/040799 | 3/2017 |
| WO | WO 2018/129373 | 7/2018 |
| WO | WO 2018/151822 | 8/2018 |
| WO | WO 2022/104341 | 5/2022 |

OTHER PUBLICATIONS

U.S. Appl. No. 11/694,882, U.S. Pat. No. 8,151,327, Systems and Methods for Detection of Session Tampering and Fraud Prevention, filed Mar. 30, 2007.
U.S. Appl. No. 13/414,678, U.S. Pat. No. 8,826,393, Systems and Methods for Detection of Session Tampering and Fraud Prevention, filed Mar. 7, 2012.
U.S. Appl. No. 14/473,818, U.S. Pat. No. 9,196,004, Systems and Methods for Detection of Session Tampering and Fraud Prevention, filed Aug. 29, 2014.
U.S. Appl. No. 14/931,799, U.S. Pat. No. 9,754,311, Systems and Methods for Detection of Session Tampering and Fraud Prevention, filed Nov. 3, 2015.
U.S. Appl. No. 15/655,045, U.S. Pat. No. 10,089,679, Systems and Methods for Detection of Session Tampering and Fraud Prevention, filed Jul. 20, 2017.
U.S. Appl. No. 16/115,411, U.S. Pat. No. 10,535,093, Systems and Methods for Detection of Session Tampering and Fraud Prevention, filed Aug. 28, 2018.
U.S. Appl. No. 16/737,256, U.S. Pat. No. 11,195,225, Systems and Methods for Detection of Session Tampering and Fraud Prevention, filed Jan. 8, 2020.
Banking Services Newsletter, "Keeping You Up-to-Date on Banking Developments Throughout the UC System", University of California, Office of the President, Banking Services Group, Newsletter Dec. 1, 2005, p. 1.
Bharosa, "Bharosa Authenticator", http://www.bharosa.com/authenticator.html, Jan. 18, 2007, pp. 3.
Bharosa, "Bharosa Announces Online Authentication Solution to Counter Check 21-Based Fraud", http://www.bharosa.com/news/PR-110705.html, Jan. 18, 2007, pp. 2.
Bourobou et al., "User Activity Recognition in Smart Homes Using Pattern Clustering Applied to Temporal ANN Algorithm", Sensors, May 21, 2015, vol. 15, pp. 11953-11971.
Darlin, Damon, "Opening the Door on the Credit Report and Throwing Away the Lock", http://www.nytimes.com/2006/03/18/business/yourmoney/18money.html, The New York Times, Saturday Mar. 18, 2006, pp. 2.
Derfler, Jr. et al, "How Networks Work", Millennium Edition, Que Corporation, Indianapolis, IN, Sep. 2000, pp. 230.
Elkhodr et al., "A Review of Mobile Location Privacy in the Internet of Things", 2012 Tenth International Conference on ICT and Knowledge Engineering, 2012, pp. 266-272.
Gralla, Preston, "How the Internet Works", Millennium Edition, Que Corporation, Indianapolis, IN, Aug. 1999, pp. 329.
Gueye et al., "Constraint-Based Geolocation of Internet Hosts", ACM Internet Measurement Conference 2004, Oct. 25-27, 2004, Taormina, Sicily, Italy, vol. 14, No. 6, pp. 288-293.
"ISO 8583", Wikipedia, http://en.wikipedia.org/wiki/ISO_8583, dated Apr. 13, 2015 in 14 pages.

Kisel et al., "Utilizing a Personalization-Enabled Access Node in Support of Converged Cross-Domain Scoring and Advertising", Bell Labs Technical Journal, 2010, vol. 15, No. 1, pp. 77-94.
Kohno et al., "Remote Physical Device Fingerprinting", Proceedings of 2005 IEEE Symposium on Security and Privacy, May 8-11, 2005, Oakland, CA, pp. 211-225.
Manavoglu et al., "Probabilistic User Behavior Models", ICDM, Third IEEE International Conference on Data Mining, Nov. 19-22, 2003, pp. 203-210.
Marshall, Jack, "Device Fingerprinting Could Be Cookie Killer", ClickZ. Mar. 2, 2011, pp. 7. http://www.clickz.com/clickz/news/2030243/device-fingerprinting-cookie-killer.
Quora, [No Author Listed], How does a tracking pixel work? by Quora, 2011.
TechWeb, "Wells Fargo Intros Anti-Theft Alerts", http://www.techweb.com/wire/166404177, Aug. 1, 2005, pp. 1.
The Knightmare, "Secrets of a Super Hacker", Loompanics Unlimited, Port Townsend, Washington, 1994, pp. 233.
"UPIC Marketing Guide—The Clearing House", http://www.upic.com/infofiles/UPIC_Marketing_Guide.pdf, as printed Dec. 19, 2006. pp. 1-16.
White, Ron, "How Computers Work", Millennium Edition, Que Corporation, Indianapolis, IN, Sep. 1999, pp. 284.
Official Communication in European Patent Application No. 05818903.6, dated Dec. 23, 2011.
Official Communication in European Patent Application No. 05818903.6, dated Mar. 18, 2014.
Official Communication in European Patent Application No. 05818903.6, dated Jul. 18, 2017.
Official Communication in European Patent Application No. 19189189.4, dated Jan. 21, 2020.
Official Communication in European Patent Application No. 19189189.4, dated Nov. 19, 2020.
International Search Report and Written Opinion for Application No. PCT/US2005/035532, dated Oct. 29, 2007.
International Preliminary Report on Patentability and Written Opinion for Application No. PCT/US2005/035532, dated Jan. 9, 2008.
Official Communication in European Patent Application No. 6845722.5, dated Mar. 13, 2009.
Official Communication in European Patent Application No. 19181057.1, dated Sep. 17, 2019.
Official Communication in European Patent Application No. 8159110.9, dated Oct. 27, 2008.
Official Communication in European Patent Application No. 8159110.9, dated Mar. 22, 2010.
Summons to Attend Oral Proceedings received in European Application No. EP08159110, dated Jul. 23, 2020.
International Search Report and Written Opinion for Application No. PCT/US2006/048251, dated Feb. 26, 2008.
International Preliminary Report on Patentability and Written Opinion for Application No. PCT/US2006/048251, dated Jun. 18, 2008.
International Search Report and Written Opinion for Application No. PCT/US2007/065776, dated Jul. 3, 2008.
International Preliminary Report on Patentability and Written Opinion for Application No. PCT/US2007/065776, dated Sep. 30, 2008.
International Search Report and Written Opinion received in PCT Application No. PCT/US2005/020750, dated Jun. 13, 2008.
International Preliminary Report on Patentability and Written Opinion received in PCT Application No. PCT/US2005/020750, dated Jul. 1, 2008.
Official Communication in European Patent Application No. 08165224.0, dated Nov. 15, 2010.
Supplementary European Search Report for Application No. EP09735653, dated Dec. 28, 2011.
Official Communication for Application No. EP09735653, dated Jan. 4, 2013.
Summons to Attend Oral Proceedings received in European Application No. EP09735653, dated Oct. 7, 2016.
International Search Report and Written Opinion for Application No. PCT/US2009/041462, dated Dec. 1, 2009.
International Preliminary Report on Patentability and Written Opinion for Application No. PCT/US2009/041462, dated Nov. 4, 2010.

(56) References Cited

OTHER PUBLICATIONS

International Search Report and Written Opinion for Application No. PCT/US2011/056948, dated Apr. 18, 2012.
International Preliminary Report on Patentability in Application No. PCT/US2011/056948, dated May 2, 2013.
International Search Report and Written Opinion for Application No. PCT/US2013/033357, dated Jul. 10, 2013.
International Preliminary Report on Patentability in Application No. PCT/US2013/033357, dated Sep. 23, 2014.
International Search Report and Written Opinion for Application No. PCT/US2013/053495, dated Nov. 22, 2013.
International Preliminary Report on Patentability in Application No. PCT/US2013/053495, dated Feb. 3, 2015.
International Search Report and Written Opinion for Application No. PCT/US2013/070146, dated Mar. 3, 2014.
International Preliminary Report on Patentability in Application No. PCT/US2013/070146, dated May 28, 2015.
Official Communication received in European Patent Application No. 16766741.9, dated Aug. 20, 2019.
Summons to Attend received in European Patent Application No. 16766741.9, dated Mar. 25, 2020.
Official Communication received in European Patent Application No. 21154719.5, dated Jun. 15, 2021.
International Search Report and Written Opinion for Application No. PCT/US2012/065220, dated Mar. 21, 2013.
International Preliminary Report on Patentability in Application No. PCT/US2012/065220, dated May 30, 2014.
International Search Report and Written Opinion for Application No. PCT/US2016/049930, dated Nov. 9, 2016.
U.S. Appl. No. 61/324,312, filed Apr. 15, 2010 in 15 pages.
Eckersley, Peter, "How Unique Is Your Web Browser?", Electronic Frontier Foundation, 2010, pp. 19.
Faulkner, Alisdair, "Fraud Network Whitepaper", ThreatMetrix, Whitepaper, 2010, pp. 16.
Schmücker, Niklas, "Web Tracking", SNET2 Seminar Paper—Summer Term 2011, Berlin University of Technology, pp. 12.
Shabtai et al., "'Andromaly': A Behavioral Malware Detection Framework for Android Devices", Journal of Intelligent Information Systems, 2012, vol. 38, pp. 161-190.

* cited by examiner

| SESSION ID | FINGERPRINT | TIME | PAGE |
|---|---|---|---|
| SID$_1$ | FP$_1$ | t$_1$ | P$_1$ |
| | FP$_2$ | t$_2$ | P$_2$ |
| | FP$_3$ | t$_3$ | P$_3$ |
| | ••• | ••• | ••• |
| SID$_2$ | FP$_1$ | t$_1$ | P$_1$ |
| | FP$_2$ | t$_2$ | P$_2$ |
| ••• | ••• | ••• | ••• |

Figure 3

SYSTEMS AND METHODS FOR DETECTION OF SESSION TAMPERING AND FRAUD PREVENTION

This application is a continuation application of U.S. Ser. No. 16/737,256, filed on Jan. 8, 2020, entitled SYSTEMS AND METHODS FOR DETECTION OF SESSION TAMPERING AND FRAUD PREVENTION, which is a continuation application of U.S. Ser. No. 16/115,411, filed on Aug. 28, 2018, entitled SYSTEMS AND METHODS FOR DETECTION OF SESSION TAMPERING AND FRAUD PREVENTION, which is a continuation application of U.S. Ser. No. 15/655,045, filed on Jul. 20, 2017, now U.S. Pat. No. 10,089,679, issued Oct. 2, 2018, entitled SYSTEMS AND METHODS FOR DETECTION OF SESSION TAMPERING AND FRAUD PREVENTION, which is a continuation application of U.S. Ser. No. 14/931,799, filed on Nov. 3, 2015, now U.S. Pat. No. 9,754,311, issued Sep. 5, 2017, entitled SYSTEMS AND METHODS FOR DETECTION OF SESSION TAMPERING AND FRAUD PREVENTION, which is a continuation of U.S. Ser. No. 14/473,818, filed on Aug. 29, 2014, now U.S. Pat. No. 9,196,004, issued Nov. 24, 2015, entitled SYSTEMS AND METHODS FOR DETECTION OF SESSION TAMPERING AND FRAUD PREVENTION, which is a continuation of U.S. Ser. No. 13/414,678, filed on Mar. 7, 2012, now U.S. Pat. No. 8,826,393, issued Sep. 2, 2014, entitled SYSTEMS AND METHODS FOR DETECTION OF SESSION TAMPERING AND FRAUD PREVENTION, which is a continuation of U.S. Ser. No. 11/694,882, filed on Mar. 30, 2007, now U.S. Pat. No. 8,151,327, issued Apr. 3, 2012, entitled SYSTEMS AND METHODS FOR DETECTION OF SESSION TAMPERING AND FRAUD PREVENTION, which claims the benefit of priority to U.S. Provisional Application Ser. No. 60/744,107, filed on Mar. 31, 2006, entitled SYSTEMS AND METHODS FOR DETECTION OF SESSION TAMPERING AND FRAUD PREVENTION, where all above-cited applications are hereby incorporated herein by reference in their entirety.

FIELD OF THE INVENTION

The invention relates to systems and methods for detecting various forms of session tampering and attempted fraud. More particularly, the invention herein relates to systems and methodologies that identify session hijacking and man-in-the-middle attacks during online transactions with financial institutions and e-commerce transactions.

BACKGROUND

Most online transactions involving the transmission of sensitive or confidential information require a high degree of certainty as to the identity of the parties involved. It is well known that members of the public access the Internet for the purpose of conducting financial transactions, online banking and purchasing of merchandise. These commercial systems suffer from a common disadvantage in that they rely on the transmission of sensitive information over unsecured network routes and lines during each transaction. While these systems often rely on encryption, password protection and other security options that are considered relatively safe, there remains significant risk of fraud, identify theft and misappropriation of information.

The Internet can be described generally as a wide area network of computers or devices that can be remotely located worldwide. The computers or devices are linked by a variety of communication links including telephone lines, cable television lines, satellite linkups, wireless networks and other telecommunication connections. Internet service providers (ISPs) provide their subscribers or end users with a link to the main backbone of the Internet. The computers and devices can connect to the Internet and are assigned IP addresses to uniquely identify them and set them apart. These computer or device IP addresses may be static or change (dynamic) during each Internet session. Each (user) session may involve some level of activity by a computer with an IP address on which a user spends time at a Web site. The number of user sessions on a site is often used in measuring the amount of traffic at a Web site. A site administrator usually determines the time frame of a user session between logging in and out, e.g., 10 minutes, before an online session is terminated or timed out due to user inactivity. However if the visitor performs some level of activity within selected time period, this can still be considered one or the same user session and any transactions conducted within that time frame would be considered part of a single session. When a user returns to the site to begin a log-in procedure, or after an allotted time period has expired, this would be considered another user session.

According to many marketing surveys, there is a relatively high percentage of companies and users who refrain from purchasing merchandise and conducting e-commerce over the Internet. There remains a persistent fear that credit card, account and other personal information will be intercepted online by a third party computer hacker and used illegally despite ongoing security efforts. This comes at great expense for users who become victims of identity theft and fraud. At the same time, online vendors and financial institutions are subject to additional risks in the course of transactions subject to illegal activity such as session tampering and session hijacking. Considering the numerous types of incidents that threaten security of enterprise systems and networks, attackers remain capable of modifying and manipulating or taking over online sessions to commit fraud and theft.

There is a need for online solutions that detect session manipulation or tampering so that fraud and the misappropriation or misuse of confidential information can be avoided.

SUMMARY OF THE INVENTION

The invention provides methods and systems related to the detection of session tampering and/or hijacking that can be used in an effort to prevent fraud. Various aspects of the invention can be appreciated individually or collectively to provide solutions against session tampering and/or hijacking.

An aspect of the invention provides methods and systems that collect multiple computer or device "fingerprints" during online visits to sites for banks, financial institutions or other companies that conduct transactions over the Internet. During the course of an online session, a Session Identifier (Session ID) can be assigned to facilitate the exchange of data between computers or devices (server/client). When a user accesses or visits an online account or site using a personal computer (PC) or any device connected to the Internet over HTTP protocol, a PC or device fingerprint corresponding to that computer or device and the relevant Session ID may be collected in accordance with this aspect of the invention.

A preferable embodiment of the invention may incorporate one or more steps of collecting computer or device fingerprints and Session IDs at various instances throughout an online session. For example, such information may be collected when a user navigates to a 4 log-in page, a page that concludes a transaction or HTML pages from a Web site that are common for online banking applications such as setting up new payees, changes of address (e-mail or street), and authorizing the wiring or transfer of money. By collecting fingerprints and/or Session ID information at several site locations or instances throughout a session, and by tracking the assigned Session ID for that particular session, incidents of session tampering or session hijacking can be detected so that appropriate responses may be conducted during the online session or post-session.

In another embodiment of the invention, methods of detecting session tampering are also provided that involve analysis of collected device fingerprints during different time intervals of an online session and/or at different portions of a web site being viewed. A preferable embodiment of the invention includes the analysis and comparison of PC fingerprints corresponding to a user device containing a relevant Session ID and other identifying information associated with the device.

Another aspect of the invention provides systems and methods for implementing secure transactions including but not limited to online purchases over the Internet. These solutions allow network or Internet users to more securely perform online transactions with other parties such as banking and financial institutions, vendors of merchandise and/or services or other transactions made over the Internet or a computer network. The occurrence of incidents involving electronic interception or session tampering or hijacking can be detected to alert companies who can thereby initiate responsive actions to prevent fraud, identify or credit card theft and financial loss.

Other goals and advantages of the invention will be further appreciated and understood when considered in conjunction with the following description and accompanying drawings. While the following description may contain specific details 5 describing particular embodiments of the invention, this should not be construed as limitations to the scope of the invention but rather as an exemplification of preferable embodiments. For each aspect of the invention, many variations are possible as known to those of ordinary skill in the art. A variety of changes and modifications can be made within the scope of the invention without departing from the spirit thereof.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The illustrations included within this specification describe many of the advantages and features of the invention. It shall be understood that similar reference numerals and characters noted within the illustrations herein may designate the same or like features of the invention. The illustrations and features depicted herein are not necessarily drawn to scale.

FIG. 3 is a table of fingerprint information corresponding to multiple sessions each identified by Session IDs.

DETAILED DESCRIPTION OF THE INVENTION

Figure 1:
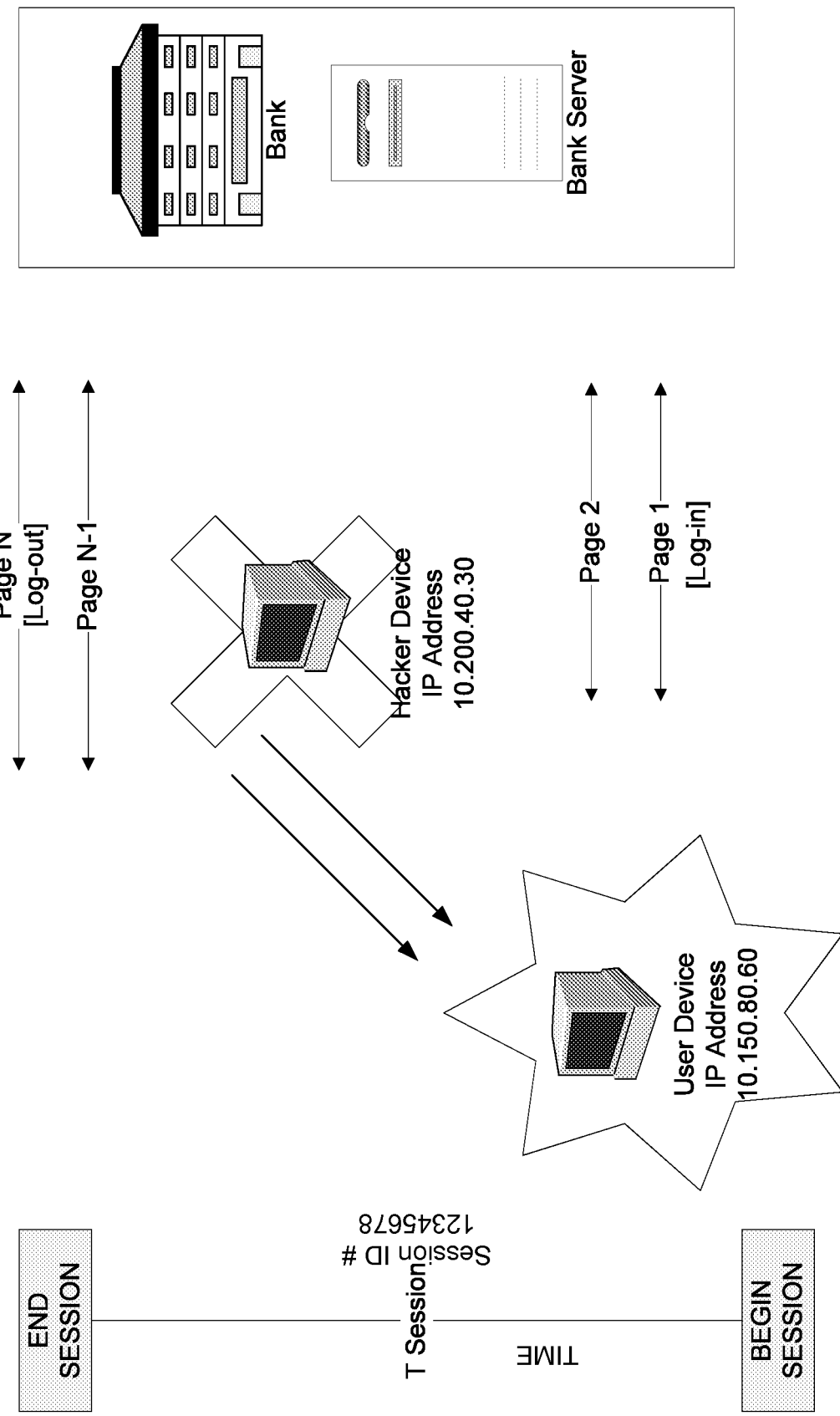
FIG. 1 illustrates an embodiment of the invention that detects session tampering by comparing a series of computer fingerprints captured throughout an online session with a selected Session ID.

The invention provides methods and apparatus for detecting session tampering and hijacking that can be applied to fraud prevention. Various aspects of the invention described herein may be applied to any of the particular applications set forth below. The invention may be applied as a stand-alone tool or as part of an integrated software solution against online fraud, identify theft and Internet security. The invention can be optionally integrated into existing business processes seamlessly and transparent to a user or an attacker (hacker). It shall be understood that different aspects of the invention can be appreciated individually, collectively or in combination with each other FIG. 1 is an illustration that describes a preferable embodiment of the invention that can detect session tampering or session hijacking. At the beginning of an online session, a unique Session ID (#12345678) can be generated or assigned by a financial institution or other company conducting a transaction with a client or user. A Session Identifier (Session ID) may be described as a value or number generated by a server that identifies a particular session with a user. From the beginning to the end of the session, the same Session ID is relied upon to correctly direct the flow of information (data packets) between host computers, or a client and a server. A Session ID may also be described as a unique number that a Web site server assigns a specific user for the duration of a user visit or session. The Session ID can be stored as a cookie, form field, or URL (Uniform Resource Locator).

Some Web servers generate Session IDs by simply incrementing static numbers. However, most servers use a variety of algorithms that involve more complex methods, such as factoring in the date and time of the visit, an IP address and other variables. In general, every time an Internet user visits a specific Web site, a new Session ID is assigned. Closing a Web browser and then reopening and visiting the site again using the same browser may generate a new Session ID. However, the same Session ID is sometimes maintained as long as the browser is open, even if the user leaves the site in question and returns. In some cases, Web servers terminate a session after a few minutes of inactivity and at a later time assign a new Session ID. If a Web browser is left active when visiting a site but nothing is entered for a predetermined time, e.g., 15 minutes, an existing Session ID can be discarded. When browsing continues later even at the same site, the user will be typically given another Session ID automatically. The use of Session IDs alone in their conventional form does not offer secure Web browsing.

Session IDs can be stolen using a variety of techniques: sniffing network traffic, using trojans on client PCs, using the HTTP referrer header where the identifier is stored in the query string parameters, and/or using script injectors such as cross-site scripting attacks where a malicious script is executed that redirects information intended for a legitimate user to the hacker instead. In addition, a Web browser may unknowingly send a URL containing a Session ID to an attacker. Hackers can also acquire Session IDs in other various ways including session prediction, stealing or brute force. Afterwards they can modify the exchange of information or do something else during an already existing session in what can be referred to as session tampering, or they can masquerade or pose as authorized users in forms of attacks that may be referred to as session hijacking. An increasingly more common kind of attack today is known as a man-in-the middle (MITM) attack. The attacker can observe the communication (e.g., by sniffing packets) between devices and collect and exploit the data that is transmitted.

Various aspects of the invention can be applied to guard against session tampering or hijacking during an exchange between different kinds of computers or user devices. Based on a comparison of a Session ID relative to a plurality of device fingerprints taken during a session, an authorized user may be distinguished from an attacker. When information is exchanged with an unauthorized device used by the attacker during an existing online session, it may be detectable in accordance with the concepts of the invention. It should be understood that reference to a client, device or personal computer (PC) herein includes any telecommunications device equipped with a browser which allows a user to access and interface with remote servers, particularly servers at Web sites on the Internet. These devices include but are not limited to cellular telephones, wireless handsets and telephones, personal digital assistants, palmtop/laptop or notebook computers and desktop PCs. It should also be recognized that the illustrated Web site server may include or be connected to a plurality of servers for a provider.

As shown in FIG. 1, a user client may be assigned an IP address (10.150.80.60) that may serve as a computer fingerprint by itself or it can be combined with other user or computer based parameters. This fingerprint can be uniquely distinguished from that of another device used by a hacker which is assigned a different IP address (10.200.40.30). An IP address may be generally described as an identifier for a computer or device on a TCP/IP network. Networks using the TCP/IP protocol are able to route messages based on the IP address of a destination. The format of an IP address is a 32-bit numeric address written as four numbers separated by periods. Each number can be zero to 255. For example, 1.150.30.220 could be an IP address. Within an isolated or private network, it may be possible to assign IP addresses at random as long as they are unique. However, connecting a private network to the Internet requires using registered IP addresses (called Internet addresses) to avoid duplicates. The concepts of this invention may be combined with other systems and methods that utilize computer or PC fingerprints (PC Prints) such as those described in US 2006/0010072 (Ser. No. 10/791,439), which is incorporated by reference herein in its entirety. Another preferable embodiment of the invention may utilize a device fingerprint that is composed of one or more relatively unique characteristics attributed to the physical device itself. For example, a computer fingerprint may relate to a time based characteristic of the internal clock with regard to another reference clock (time differential) or by itself (clock skew). These and other temporal characteristics of a device based on computer clocks can provide computer fingerprints in accordance with then invention by themselves or they can be combined with other distinguishing characteristics of a computing device.

During online sessions where the security of transmission between a client/server is compromised, an attacker hijacks or tampers with an already established session from another PC or device that would exhibit a different fingerprint. The established session between a user client and a Web server usually has an associated Session ID already assigned. The Session ID would include a piece of generated data to be used in network communications often over HTTP to identify a session or a series of related message exchanges. Session IDs often become necessary in cases where the communications infrastructure between computers uses a stateless protocol such as HTTP. For example, concepts of the invention can be applied to provide an e-commerce solution to detection intrusion by a hacker or thief. A Buyer who visits a Seller Web site may want to purchase a number of articles during a visit and place them during the interim in a virtual shopping cart. The Buyer can then finalize shopping by going to the site checkout page to effect payment. This typically involves an ongoing communication where a plurality of Web pages is requested by the client, and they are sent back by the server in turn. In such a situation, it is often important to keep track of the current state of the shopper cart, and a Session ID is one of the pieces of information used to achieve that goal. Once the Buyer finalizes an order or completes a certain activity, the Session ID may no longer be valid or and another session would be initiated with a new Session ID in order to purchase additional items. As described elsewhere herein, a plurality of user device fingerprints may be collected and compared to respective Session IDs with respect to online ordering and purchasing in order to detect session tampering or hijacking.

In a preferable embodiment of the invention, as illustrated in FIG. 1, a Session ID can be generated when a visitor or customer user visits an online financial or banking institution Web site. When logging-on to the site from a home page (Page 1), a new session may commence and the associated Session ID may be generated and stored by various ways as described elsewhere herein such as a cookie by a Web browser application. The browser may transparently include the cookie data in all subsequent page requests to a server within the financial institution system, thus allowing it to identify the session and send back pages to the user that may include such financial or personal data as requested. Unlike user IDs (e.g., personal user names or numbers), Session IDs are typically short-lived since they expire after a preset time of inactivity which may be minutes or hours (timed-out) or may become invalid after a certain goal or activity has been met or accomplished (log-out or logoff).

Some preferable embodiments of the invention can be employed to defend against session hijacking by collecting PC fingerprints and Session ID information at multiple points of time or selected time intervals during an online banking session. Session hijacking has been described as the act of taking control of a user session after successfully obtaining or generating an authentication Session ID. Often times session hijacking involves an attacker using Session IDs captured by techniques involving brute force or reverse-engineering in order to seize control of a banking session and other Web application sessions while that session is still in progress.

A Session ID is often an identification string that is usually composed of a long, random, alpha-numeric string that is transmitted between host devices such as a client and a server. Session IDs are commonly stored in cookies, URLs and hidden fields of Web pages. A URL containing a Session ID might resemble something such like the following: http://www.123somesite.com/view/7AD30725122120803.
In an HTML page, a Session ID may be stored as a hidden field and resemble something like the following: <input type="hidden" name="sessionID" value="54321abcd">. Alternatively, cookies can include Session ID information and can be set to expire (or be deleted) upon the closing of a Web browser. These are termed "session cookies" or "non-persistent" cookies typically. Cookies that last beyond a user's session are termed "persistent" cookies. Persistent cookies are usually stored in memory on a computer hard drive.

There are other known shortcomings or problems associated with employing Session IDs besides how they can be readily located by hackers. Many popular Web sites use algorithms based on easily predictable variables, such as time or IP address, in order to generate the Session IDs, causing their Session IDs to be predictable. If encryption is not used (typically SSL), Session IDs are transmitted in a clear and susceptible form that is susceptible to eavesdropping and session hijacking. In session hijacking attacks, an attacker usually takes over an already existing session that is underway. This may occur entirely unnoticed by the authorized user who may still believe an online session is ongoing. As described elsewhere herein, a client and server communication usually takes place across a network using IP-based communication methods. An attacker may use a computer and hacking software or tools to gain access to a connection between a legitimate client and Web server on the Internet, for example. The attacker can then inspect and capture traffic (packets) going over the network during an online session. By beating the client in replying back to the Web server with seemingly legitimate messages, the session may thus continue but with the attacking host computer. Accordingly, the session with the legitimate client can be dropped and the attacker can practically do anything that the legitimate client could accomplish.

Accordingly, this aspect of the invention presents comparative evidence of session hijacking when the same Session ID is used by different computers or devices that exhibit different fingerprints. A one-to-many relationship as between a Session ID and multiple device fingerprints would suggest that the online session was compromised so remedial action should be taken or required to prevent fraud or minimize risk of loss. In a preferable embodiment of the invention, a one-to-many relationship as between a Session ID and multiple IP addresses could be used to signal or identify the occurrence of session hijacking. The step of authentication can be performed numerous times during an online session rather than just at log-in to confirm user identities based on their device fingerprints for a corresponding Session ID in progress. It should be understood that device fingerprints may include an IP address component alone or with a combination of other parameters or characteristics of the device.

In another embodiment of the invention, methods of detecting session tampering are also provided. Attacks involving session tampering typically involve an attacker (or a computer program that runs on behalf of an attacker) doing something that allows the revelation or modification of the characteristics to an already established session.

Methods provided herein to detect session tampering may include an initial step of placing a plurality of fingerprint collectors in preselected or strategic locations on a Web site. A fingerprint collector may be described as a computer program residing in the memory of computer or server that is designed to extract device fingerprint information from the data or information exchanged between a (Web) server in order to identify a user device characteristic including but not limited to IP address information (see FIG. 1—Bank Server). The Web site may be designed with a group of pages (HTML pages) that contain any number of hyperlinks to each other and made available online by an individual, company, educational institution, government, or organization. For example, a financial institution may place fingerprint collectors at a log-in page (Page 1) where a customer use accesses a bank account. Other pages (Page 2) may include a fingerprint collector such as a portion of a Web site designed to facilitate electronic checking transactions or activity such as pages to "Add a New Payee" or to "Change E-mail/Street address or User Profile Information" or to "Wire Funds" or to "Make a Payment."

As with other embodiments of the invention herein, another step according to this methodology may include placement of a session collector for collecting Session ID data on each page, which is provided by an established default mechanism for most Web sites to manage and identify user sessions. A session collector may be described as a computer program residing in the memory of computer or server that is designed to extract device Session ID information from the data or information exchanged between a (Web) server in order to identify a particular online session (see FIG. 1—Bank Server). While a comparison between a plurality of fingerprints for a particular Session ID may be accomplished real-time during a session, a preferable embodiment of the invention includes a subsequent step of comparing fingerprints following termination of a session (post-session) after log-out (Page N). All of the collected fingerprints from a session can be compared with a Session ID for a particular session. This comparison can detect when or if the fingerprints of a computer or device used during the session are not all identical. When the fingerprints collected at different pages and times throughout a session are not the same for a selected Session ID, this may suggest that session hijacking and/or session tampering occurred through some unauthorized intervention. It should be understood that alternative aspects of the invention include modification and creation of corresponding algorithms to perform any or all of the preceding steps.

Another aspect of the invention provides systems and methods for implementing secure transactions including but not limited to online purchases over the Internet. During preselected time intervals or pages at a Web site, a plurality of computer fingerprints may be collected throughout the session for the computer on which a consumer conducts a purchase online by using and entering credit card information. In addition, the computer fingerprints can be collected and compared to a Session ID number assigned to the session by an online merchant. When a selected fingerprint is determined to be different from the others collected during the session, the merchant will be able to suspect possible session tampering or hijacking. By collecting fingerprints and Session ID information in several locations of the site in accordance with this aspect of the invention, online retailers and others who are exposed to Internet fraud can identify when a session has been tampered with or hijacked by another device (hacker computer) that is using the same Session ID.

Figure 2:
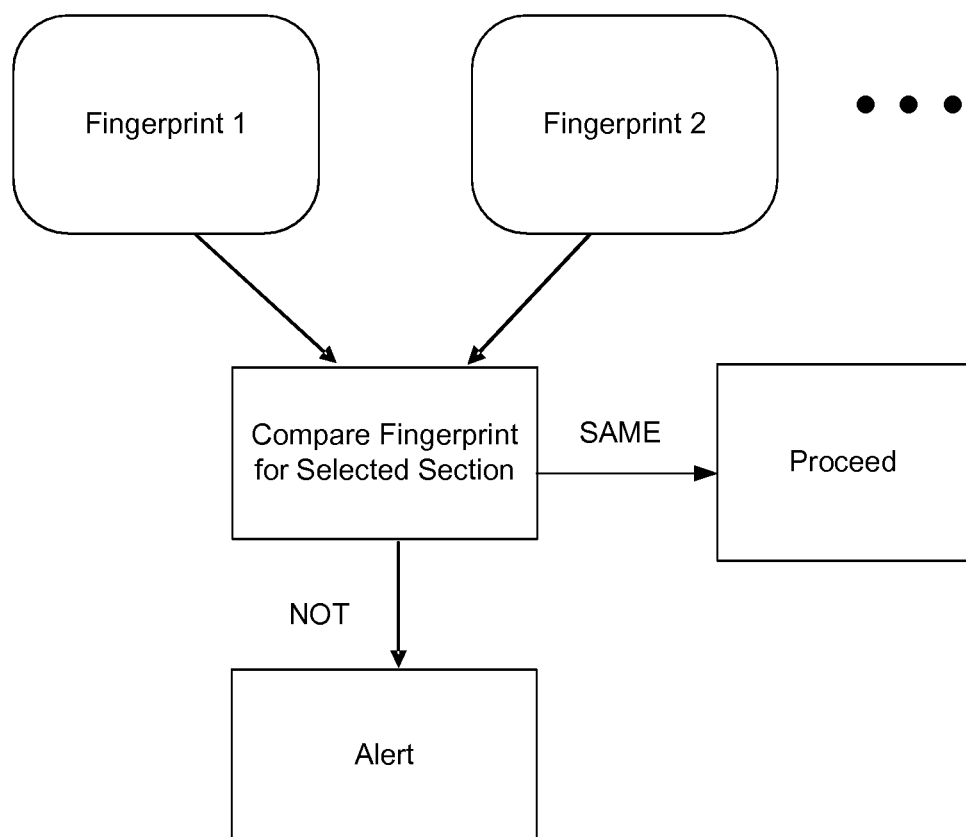
FIG. 2 describes the comparison of multiple device fingerprints taken at different times during an online session.

As shown in FIG. 2, one or more fingerprints may be compared to determine whether they match or not during an online session. For that particular online session, a persistent Session ID should be assigned and maintained for a particular user device. The user device should exhibit the same fingerprint throughout the session to suggest that no communications exchanged with a Web server came from or were redirected to another device. A first fingerprint (Fingerprint 1) can be compared against a second fingerprint (Fingerprint 2) in a preferable embodiment of the invention. One, two or more fingerprints may be collected with device fingerprint collectors as described elsewhere herein during any selected time interval of a session, or at any selected Web page that may be requested and viewed by a user through a browser. Session ID information may be also collected at substantially the same time. For example, an authentication server may be configured to extract the IP address from the information exchanged between a Web server and a user device. The IP address alone may form the device fingerprint or other parameters or user device characteristics may be included too such as a Browser ID. If the first fingerprint matches the second fingerprint with respect to the same Session ID, then the user may be allowed to proceed to another Web page or portion of a site.

Furthermore, for online banking applications, the first fingerprint may be taken while the user is logging-on from a home page. A Session ID can be then established for that session. Before allowing the user to perform online banking functions or activity including but not limited to withdrawing or transferring funds or changing passwords, the second fingerprint may be collected along with its corresponding Session ID information. Unlike conventional systems, this additional authentication step is performed again so that the comparison between fingerprints can be performed for that particular session relative to the same Session ID. When the fingerprints do not match, then the activity requested may be immediately denied and communicated to the user. For other applications of the invention, the transaction may be flagged for further review later by the financial institution. It may not be preferable often times to reveal to attackers at what point in time during a session was fraud suspected.

Another preferable embodiment of the invention provides post-session comparison of user or device fingerprints and Session IDs. This analysis allows the merchant to reject a transaction or to at least flag an incident so that further investigation can be conducted. For example, many financial institutions (e.g., Bank of America) build-in lag time or delay as to when financial activity such as electronic checking can be completed by a customer payor and mailed to a payee. An online customer may be advised of status such as the transaction is "pending" or "in progress" or "scheduled." During this time, in addition to other desired procedural checks implemented by the financial institution, a series of customer transactions reports can be analyzed for possible fraud.

FIG. 3 illustrates another embodiment of the invention that provides backend solutions to detect and prevent fraud. A server may resided within the network of a financial institution and have a database memory for storing customer transactions with corresponding session information. The session information may include a plurality of Session IDs (SID1, SID2 etc.) for one or more customers requesting numerous transactions. Each transaction may have a Session ID and a plurality of user fingerprints (FP1, FP2 etc.) obtained or collected at different times during the session or at different locations/pages of the bank Web site. As with other embodiments of the invention, it shall be understood that the number of user fingerprints collected may be varied. For certain kinds of transactions, accounts or instances where the levels of suspected fraud are unusually high, it may be preferable to collect relatively more fingerprints throughout an online session. The session information may include the times (t1, t2, etc.) as to when fingerprints are collected and/or the locations (Web pages) where fingerprints are obtained (P1, P2 etc.). For preferable embodiments of the invention, a person (fraud case analyst) can manually inspect and review the session information and customer transaction reports, or a computer program can be selected to compare user fingerprints collected corresponding to a particular Session ID in order to assess the likelihood of fraud. Accordingly, these fraud detection solutions can be relatively invisible to an attacker (hacker) and provide more secure user transactions with parties such as banking and financial institutions, vendors of merchandise and/or services or other transactions made over the Internet or a computer network. The occurrence of incidents involving electronic interception or session tampering or hijacking can be detected to alert companies who can thereby initiate responsive actions to prevent fraud and financial loss.

The invention herein provides methods and systems for fraud prevention and security relating to online sessions with users on a network or the Internet. It shall be understood that principles of the invention can be applied and modified for application with other fraud prevention and session monitoring systems and methods such as those described in published U.S. patent applications US 2002/0073046 (Ser. No. 09/875,795) and US 2004/0254890 (Ser. No. 10/444,506), which are each incorporated by reference herein in their entirety. Any of the aforementioned embodiments of the invention can be also integrated into existing business processes and state-of-the art security systems. For example, the invention may be applied to authentication systems that incorporate static (persistent) passwords that remain the same in between sessions and log-ins. Or, alternatively, various aspects of the invention can be applied to systems that provide a onetime password (OTP) that changes for each online session. The use of an OTP makes it more difficult usually to gain unauthorized access to restricted resources or online sessions. An OTP may be essentially a series of numbers or other characters generated by a mathematical algorithm (soft token) and/or displayed on a physical device (hard token) that is synchronized with an authentication server. Even with relatively secure sessions protected by OTP authentication, session tampering and/or hijacking is possible. Accordingly, multiple computer or device fingerprints can be collected as described above during multiple points or places during an online session authenticated with an OTP token so that a comparison can be made relative to particular Session ID.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A computer system comprising:
   a hardware processor configured to execute software instructions to cause the computer system to:
   associate a session identifier with an online session between a first device and a second device, wherein the first device is a user device;
   receive a plurality of fingerprints collected during the online session;
   determine, following termination of the online session, based at least in part on the session identifier and the plurality of fingerprints, that an unauthorized third device is associated with the online session;

store the session identifier and the plurality of fingerprints for review after termination of the online session; and notify the first device or the second device of the association of the unauthorized third device with the online session.

2. The computer system of claim 1, wherein determining that an unauthorized third device is associated with the online session comprises determining that a one-to-many relationship exists.

3. The computer system of claim 2, wherein the hardware processor is configured to further cause the computer system to:

upon determination that the one-to-many relationship exists, generate a signal or identify an occurrence of session hijacking.

4. The computer system of claim 1, wherein the plurality of fingerprints are collected at multiple points of time during the online session.

5. The computer system of claim 1, wherein:

at least one of the plurality of fingerprints is collected prior to associating the session identifier; and at least one of the plurality of fingerprints is collected after associating the session identifier.

6. The computer system of claim 1, wherein the session identifier and the plurality of fingerprints are stored such that stored data from the online session can be analyzed after termination of the online session.

7. The computer system of claim 1, wherein the notifying of the first device or second device includes transmitting to the first device or second device, a portion of the stored session identifier or plurality of fingerprints.

8. The computer system of claim 1, wherein the hardware processor is configured to further cause the computer system to:

in response to a notification that an unauthorized third devices was associated with the online session, allow the first device or second device to deny activity requested during the online session, wherein the activity requested can originate from the first device, the second device, or the unauthorized third device.

9. The computer system of claim 2, wherein the hardware processor is configured to further cause the computer system to:

in response to the determination that a one-to-many relationship exists, deny activity requested during the online session, wherein the activity requested can originate from the first device, the second device, or the unauthorized third device.

10. The computer system of claim 1, wherein the online session is associated with multiple IP addresses.

11. The computer system of claim 10, wherein an IP address corresponding to the unauthorized third device is different from IP addresses corresponding to the first device and the second device.

12. The computer system of claim 1, wherein the termination of the online session comprises a log-off of the online session.

13. The computer system of claim 1, wherein the plurality of fingerprints comprise one or more characteristics attributed to a user device associated with the online session.

14. The computer system of claim 13, wherein the one or more characteristics comprise an IP address.

15. The computer system of claim 13, wherein the one or more characteristics comprise a time-based characteristic.

16. The computer system of claim 15, wherein the time-based characteristic is a at least one of a time differential with regard to a reference clock or a time difference between the first device and the second device.

17. The computer system of claim 2, wherein the one-to-many relationship indicates that the plurality of fingerprints associated with the session identifier are not identical.

18. The computer system of claim 1, wherein the plurality of fingerprints are collected by one or more fingerprint collectors, and wherein the one or more fingerprint collectors are placed in preselected locations on a web site.

19. A computer-implemented method comprising:

associating a session identifier with an online session between a first device and a second device, wherein the first device is a user device;

receiving a plurality of fingerprints collected during the online session;

determine following termination of the online session, based at least in part on the session identifier and the plurality of fingerprints, that an unauthorized third device is associated with the online session;

storing the session identifier and the plurality of fingerprints for review after termination of the online session; and notifying the first device or second devices of the association of an unauthorized third device with the online session.

20. A non-transitory computer storage having stored thereon a computer program, the computer program including executable instructions that instruct a computer system to at least:

associate a session identifier for an online session between a first device and a second device, wherein the first device is a user device;

receive a plurality of fingerprints collected during the online session;

determine, following termination of the online session, based at least in part on the session identifier and the plurality of fingerprints, that an unauthorized third device is associated with the online session;

store the session identifier and the plurality of fingerprints for review after termination of the online session;

notify the first device or second devices of the association of an unauthorized third device with the online session.

* * * * *

UNITED STATES PATENT AND TRADEMARK OFFICE
CERTIFICATE OF CORRECTION

PATENT NO. : 11,727,471 B2
APPLICATION NO. : 17/518416
DATED : August 15, 2023
INVENTOR(S) : Ori Eisen It is certified that error appears in the above-identified patent and that said Letters Patent is hereby corrected as shown below:

In the Specification

Column 4, Line 20, delete "other" and insert -- other. --.

Column 6, Line 18, delete "or and" and insert -- and/or --.

In the Claims

Column 11, Line 31, Claim 7, delete "transmitting" and insert -- transmitting, --.

Column 12, Line 12, Claim 16, delete "is a at least" and insert -- is at least --.

Signed and Sealed this
Seventeenth Day of October, 2023

Katherine Kelly Vidal
*Director of the United States Patent and Trademark Office*